(12) United States Patent
Shafron et al.

(10) Patent No.: US 7,650,378 B2
(45) Date of Patent: *Jan. 19, 2010

(54) METHOD AND SYSTEM FOR ENABLING A SCRIPT ON A FIRST COMPUTER TO EXCHANGE DATA WITH A SCRIPT ON A SECOND COMPUTER OVER A NETWORK

(75) Inventors: Thomas Shafron, Miami Beach, FL (US); Christopher Staib, Wilton, CT (US)

(73) Assignee: Yahoo! Inc., Sunnyvale, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 11/337,128

(22) Filed: Jan. 19, 2006

(65) Prior Publication Data

US 2006/0117107 A1    Jun. 1, 2006

Related U.S. Application Data

(63) Continuation of application No. 09/904,300, filed on Jul. 12, 2001, now Pat. No. 7,051,119.

(51) Int. Cl.
    *G06F 15/16* (2006.01)
(52) U.S. Cl. .................. 709/203; 709/217; 709/223
(58) Field of Classification Search .................. 709/203, 709/204, 205, 227, 229, 245, 248, 249, 217, 709/219, 223, 224
    See application file for complete search history.

(56) References Cited

U.S. PATENT DOCUMENTS

| | | | | |
|---|---|---|---|---|
| 5,623,656 A * | 4/1997 | Lyons | ........................ | 707/10 |
| 5,732,219 A * | 3/1998 | Blumer et al. | .............. | 709/227 |
| 5,790,798 A * | 8/1998 | Beckett et al. | .............. | 709/224 |
| 5,862,330 A * | 1/1999 | Anupam et al. | ............. | 709/204 |
| 5,941,957 A * | 8/1999 | Ingrassia et al. | ............. | 709/248 |
| 5,951,652 A * | 9/1999 | Ingrassia et al. | ............. | 709/248 |
| 5,954,798 A * | 9/1999 | Shelton et al. | .............. | 709/224 |
| 5,991,796 A * | 11/1999 | Anupam et al. | ............. | 709/206 |
| 6,035,264 A * | 3/2000 | Donaldson et al. | .......... | 702/182 |
| 6,070,185 A * | 5/2000 | Anupam et al. | ............. | 709/204 |
| 6,144,991 A * | 11/2000 | England | ..................... | 709/205 |
| 6,175,842 B1 * | 1/2001 | Kirk et al. | .................... | 715/513 |
| 6,188,400 B1 * | 2/2001 | House et al. | ................. | 345/805 |
| 6,188,401 B1 * | 2/2001 | Peyer | ......................... | 345/805 |
| 6,192,394 B1 * | 2/2001 | Gutfreund et al. | ........... | 709/204 |
| 6,223,188 B1 * | 4/2001 | Albers et al. | ............. | 715/501.1 |
| 6,240,444 B1 * | 5/2001 | Fin et al. | .................... | 709/205 |
| 6,256,635 B1 * | 7/2001 | Arrouye et al. | ............. | 707/102 |
| 6,295,551 B1 * | 9/2001 | Roberts et al. | .............. | 709/205 |
| 6,353,851 B1 * | 3/2002 | Anupam et al. | ............. | 709/204 |
| 6,356,882 B1 * | 3/2002 | Carroll et al. | ............... | 705/401 |

(Continued)

*Primary Examiner*—LaShonda T Jacobs
(74) *Attorney, Agent, or Firm*—James J. DeCarlo; Greenberg Traurig, LLP

(57) ABSTRACT

A method and system for enabling a script on a first computer to communicate and exchange data with a script on a second computer so as to provide access by the script to data typically inaccessible by a script. The method and system enable a first computer to control the Internet navigation of a second computer, and also enable instant messaging between a first computer and a member of a synchronization group. The computers may be connectable with each other over any type of network (e.g., LAN, WAN, intranet, Internet, cellular, etc.).

25 Claims, 18 Drawing Sheets

U.S. PATENT DOCUMENTS

| | | | |
|---|---|---|---|
| 6,356,933 B2 * | 3/2002 | Mitchell et al. | 709/203 |
| 6,360,250 B1 * | 3/2002 | Anupam et al. | 709/204 |
| 6,411,989 B1 * | 6/2002 | Anupam et al. | 709/204 |
| 6,564,261 B1 * | 5/2003 | Gudjonsson et al. | 709/227 |
| 6,654,785 B1 * | 11/2003 | Craig | 709/203 |
| 6,668,276 B1 * | 12/2003 | Ohkado et al. | 709/217 |
| 6,748,420 B1 * | 6/2004 | Quatrano et al. | 709/205 |
| 7,149,776 B1 * | 12/2006 | Roy et al. | 709/205 |
| 2002/0035603 A1 * | 3/2002 | Lee et al. | 709/205 |
| 2002/0083134 A1 * | 6/2002 | Bauer et al. | 709/204 |
| 2002/0198941 A1 * | 12/2002 | Gavrilescu et al. | 709/205 |
| 2003/0041108 A1 * | 2/2003 | Henrick et al. | 709/205 |
| 2004/0225716 A1 * | 11/2004 | Shamir et al. | 709/204 |
| 2006/0080391 A1 * | 4/2006 | Mumick et al. | 709/205 |

* cited by examiner

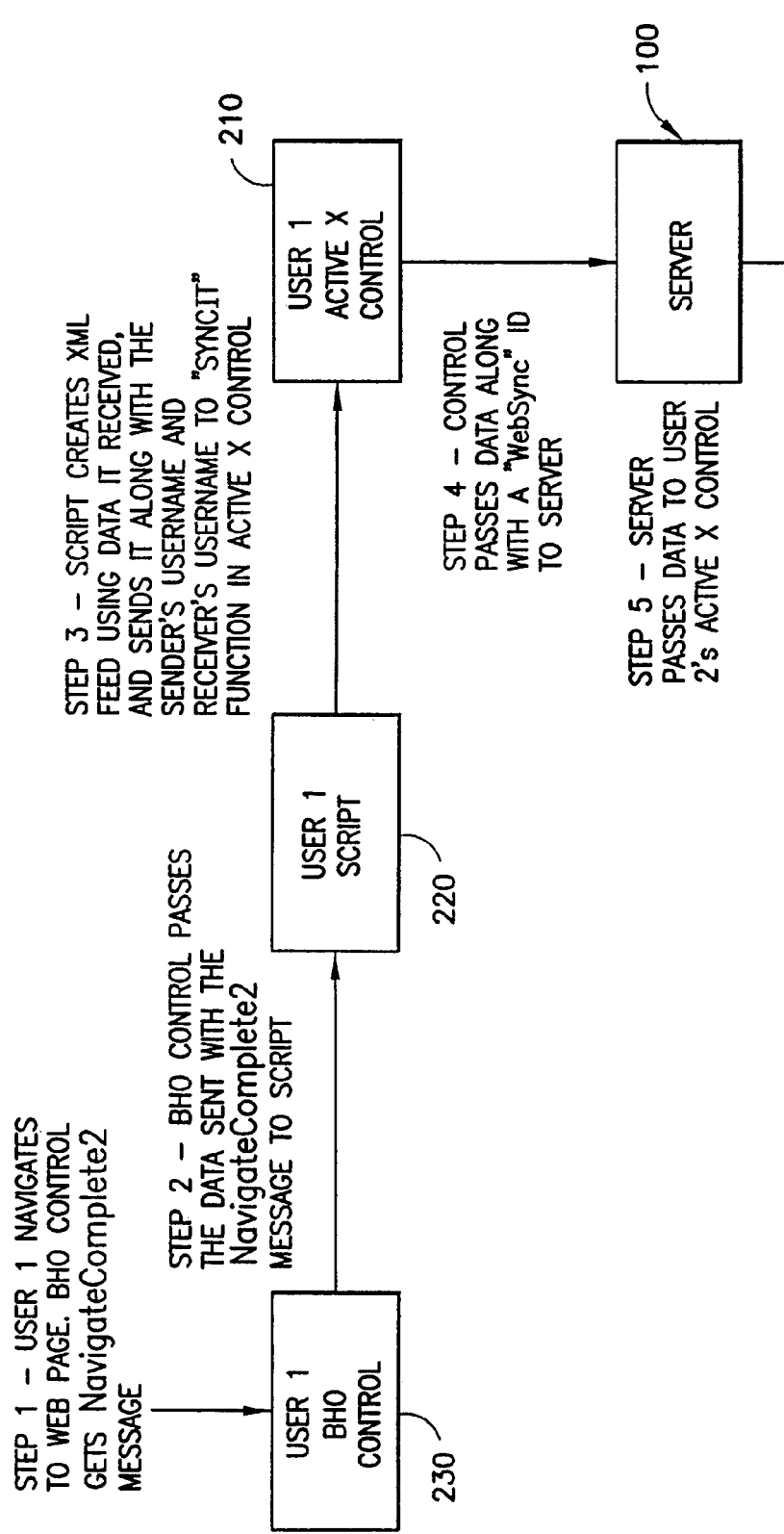

METHOD AND SYSTEM FOR ENABLING A SCRIPT ON A FIRST COMPUTER TO EXCHANGE DATA WITH A SCRIPT ON A SECOND COMPUTER OVER A NETWORK

CROSS-REFERENCE TO RELATED APPLICATIONS

This continuation application claims the benefit of application Ser. No. 09/904,300, filed Jul. 12, 2001, now U.S. Pat. No. 7,051,119 issued on May 23, 2006, entitled METHOD AND SYSTEM FOR ENABLING A SCRIPT ON A FIRST COMPUTER TO COMMUNICATE AND EXCHANGE DATA WITH A SCRIPT ON A SECOND COMPUTER OVER A NETWORK, which is hereby incorporated herein by reference.

FIELD OF THE INVENTION

This invention is directed to a method and system for enabling a script on a first computer to transmit and exchange data with a script on a second computer over a network.

BACKGROUND OF INVENTION

A script, written in JavaScript, VBScript, or other similar scripting language, provides a simple way to add certain functionality to a web page. For example, buttons and scrollbars may be easily added to a web page using a script. However, the functionality available from a script is limited because a script cannot directly access a computer's operating system. In addition, a first script (script A) on a first computer (computer A) cannot transmit and exchange data with a second script (script B) on a second computer (computer B). Thus, a user of computer A cannot share the functionality of script A with one the user of computer B.

SUMMARY OF THE INVENTION

The present invention is directed to a method and system for enabling a script on a first computer to transmit and exchange data with a script on a second computer. The computers may be connectable with each other over any type of network (e.g., LAN, WAN, intranet, Internet, cellular, etc.).

In an embodiment, a first script and a first control are downloaded to a first computer. Alternatively, scripts and controls may be downloaded to both a first and second computer, or the scripts may be installed on the computer(s) using other now known or hereafter developed methods, techniques, systems, devices, etc. Typically, a user of the computer may access the functionality of a script, and pass data to and receive data from the script. A control typically has a predefined functionality (or plurality of functionality), access to other programs on the computer (e.g., operating system, communication program and interface, etc.).

In accordance with an embodiment of the present invention, the first script can receive data input from a user of the first computer, and the first control has a function defined therein (e.g., a login function), and can communicate with the first script for receiving the data input by the user. The first control can communicate with a server (i.e., transmit) and transmit the data received by the first control from the first script (i.e., the data entered by the user) to the server. The server transmits the data received from the first computer to the second computer for receipt by a second control on the second computer, with the second control communicating with a second script and transmitting the data received from the first computer. Thus, the first script can pass data to and effectively control the second script. For example, the first script can send a command to the second script instructing the second script how to manipulate the Document Object Model (DOM) of an Internet browser window. One example of this might be to control the display of a second computer by displaying a certain advertisement in a web page being viewed (i.e., being displayed by the computer display as an Internet browser window or an image within a browser window) by the a user of the second computer. To insert an <IMG> tag into the DOM of the web page being viewed by the second user, the first script transmits (via the first control, server, and second control) data to second script instructing the second script to insert a specific image (i.e., advertisement) into the DOM of the Internet browser window. The first script may thus control the second script so that a specific advertisement (i.e., image) is displayable in the Internet browser window being viewed by the second user By providing communication between the script and control, and between the control and server, the present invention provides advantages over the prior art. For example, in accordance with the present invention, a script may now have access to data and functionality of the control such as, for example, functions typically made available by the control to other applications via a component object model (COM) interface. Those functions and functionality are typically not available to a script.

In another embodiment of the present invention, scripts and controls enable synchronization of a first and second computer so that the second computer is caused to navigate the Internet (i.e., to move from one Internet site to another) based upon the Internet navigation of the first computer. This embodiment of the present invention enables a user of the first computer to login to a synchronization group, and to synchronize with a user of the second computer (i.e., to cause the first and second computers to synchronize with each other). The user requesting synchronization with another user becomes the "leader", controlling Internet navigation for all computers having logged in to the synchronization group. When users of the various computers have logged in to the synchronization group (i.e., when the computers are synchronized), the present invention controls the Internet navigation of the "follower" computers based on the Internet navigation of the "leader" computer. Users of computers logged in to the synchronization group may send instant messages to each other. Again, a script and a control provide the functionality of this embodiment of the present invention.

The advantages of the present invention over the prior art are manifest. The present invention combines the simplicity of a script with the flexibility and freedom of a control to improve inter-connectivity between and among computers connected in a network and to improve the control available to a user of a computer over other computers.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

The present invention is directed to a method and system for enabling a script on a first computer to communicate and exchange data with a script on a second computer. The computers may be connectable with each other over any type of network (e.g., LAN, WAN, intranet, Internet (including the World-Wide Web), cellular, etc.) via a server. The present invention enables a script, such as those written in the JavaScript or VBScript scripting language, running on one computer to communicate and exchange data across a network with a script or scripts running on other computers. As used herein, the term "computer" is intended to be construed broadly, and in a non-limiting manner, and to include, without limitation and by way of illustration only, any electronic device capable of receiving input, processing, storing and providing output, typically as digital data. A computer may be a computer of any style, size, and configuration including, without limitation, a server, workstation, desktop, laptop, Internet appliance, notebook, personal digital assistant (PDA), etc. A computer typically includes the following components: a central processing unit (CPU or processor) operable in connection with software (e.g., operating system, application, etc.), a disk drive (e.g., floppy, CD-ROM, DVD, etc.), permanent memory (e.g., hard-disk drive, ROM), temporary memory (e.g., RAM), an input device (e.g., keyboard, mouse, trackball, etc.), an output device (e.g., display), and a communication interface (e.g., modem). It is known to persons skilled in the art that a computer may comprise some or all of those components, in addition to components not listed.

Communication between a script and the server in accordance with the present invention involves the use of one or more control(s) to handle the communication between the script and the server. This preferred method provides increased functionality and is more robust because of the greater flexibility and freedom available via the control. The control gives the script access to data and functionality that the script itself would otherwise be prohibited from. The terms "communicate" and "transmit" (and variations thereof) are used interchangeably herein to refer to the exchange of data (typically digital data) within a single computer (e.g., between and among any of a script, an application, a control, etc.) and/or between one or more computers.

Figure 1:
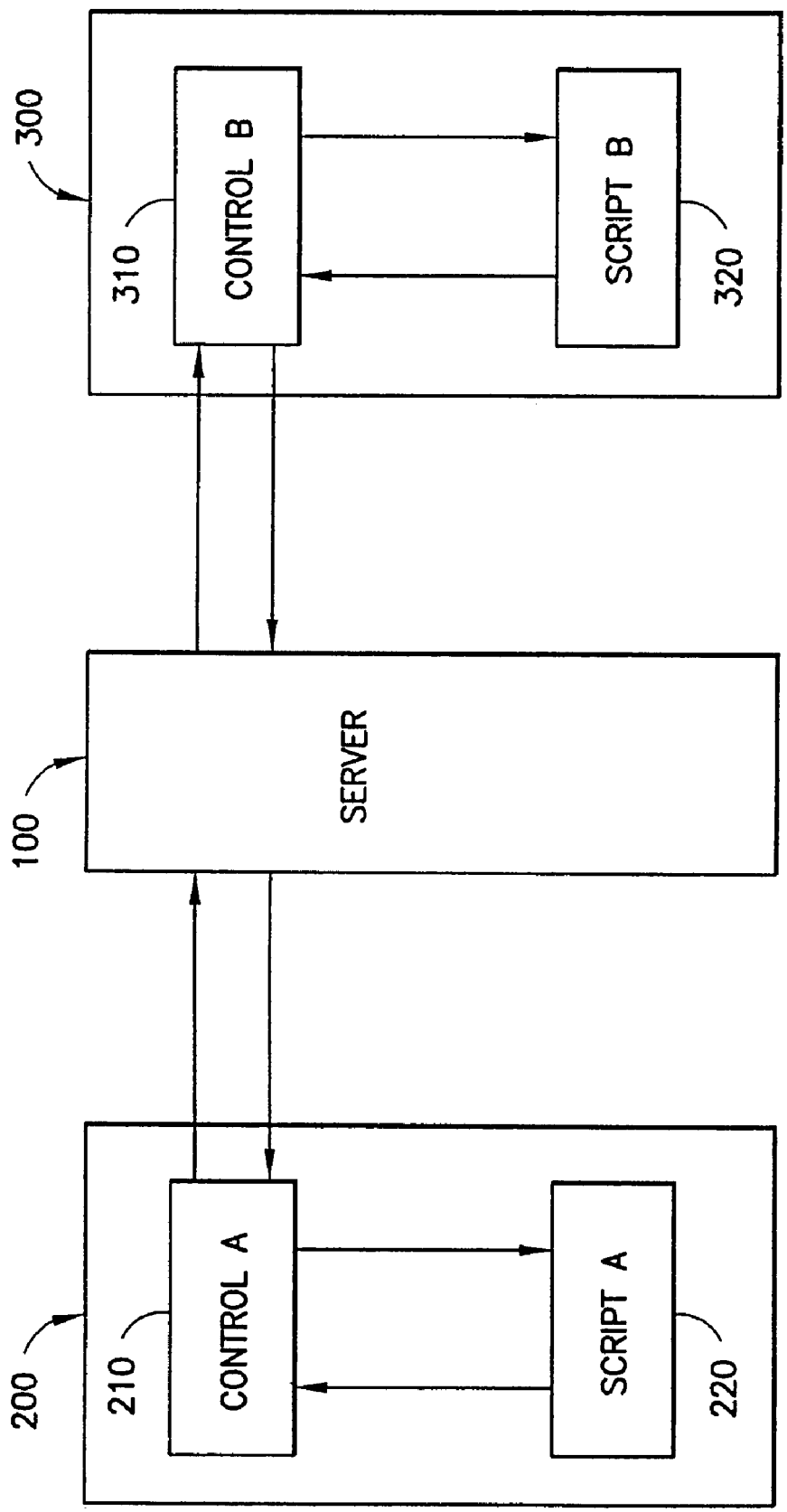
FIG. 1 is a schematic block diagram of a first and second computer connectable to each other via a server and each having a script and a control thereon in accordance with an embodiment of the present invention.

Referring now to the drawings, and with reference for to FIG. 1, a server 100 is there depicted having connected thereto a first client computer 200 and a second client computer 300. The server 100 and computers 200, 300 may comprise a self-contained network (i.e., comprising no other computers), a part of an intranet, a part of the Internet, or virtually any other type of configuration of network, so long as the functionality of the server 100 and computers 200, 300, is in accordance with embodiments of the present invention, as described in more detail below. The server 100 contains software to process a request (whether that be the control, the script, or whatever) from the client computer, and determine how to process the request. In some instances the server 100 might be required to forward the request to another client computer (see, e.g., FIG. 1), broadcast the request to multiple client computers (see, e.g., FIG. 2), pass data back to the client computer from which the data was sent, or process the request itself and not return any data to the client computer.

The functionality of the present invention is provided in part, at least in the first instance, by the server 100. To provide the functionality on each client computer, each client computer must connect to the server, typically via an Internet browser, and download, from the server to the client computer, certain computer code that may include a script 220, 320 and a control 210, 310. A user of the first computer 200, for example, may access the server 100 via an Internet browser installed on and operable in connection with the first computer 200. Having thus accessed the server 100, the user of the first computer 200 may cause, or the user may request that the server 100 cause, certain computer code or software to be downloaded from the server 100 to a memory device of the first computer; in particular, any of a script 220 and control 210 may be downloaded by the server 100 to the computer 200 for permanent storage thereon (e.g., on the computer hard disk). In addition or alternatively, one or more scripts may be loaded on the computer 200 prior to connection of the computer 200 to the server 100 and prior to download of the certain computer code or software by the server 100 to the computer 200. The functionality provided by the present invention is thereafter carried out by the script 220, control 210, and the server 100.

While the scripts 220, 320 are preferably downloaded by the server 100 to the various client computers 200, 300, they may be loaded on the client computers 200, 300 using any now known or hereafter developed methods, devices, systems, etc., form transmitting digital data from one computer to another.

It should be noted that in a preferred embodiment of the present invention, a script 220 and a control 210 are downloaded by the server 100 to the user's computer 200. However, other computer programs, files, software, etc., may be downloaded by the server 100 to the user's computer 200 to provide the functionality of the present invention.

Figure 2:
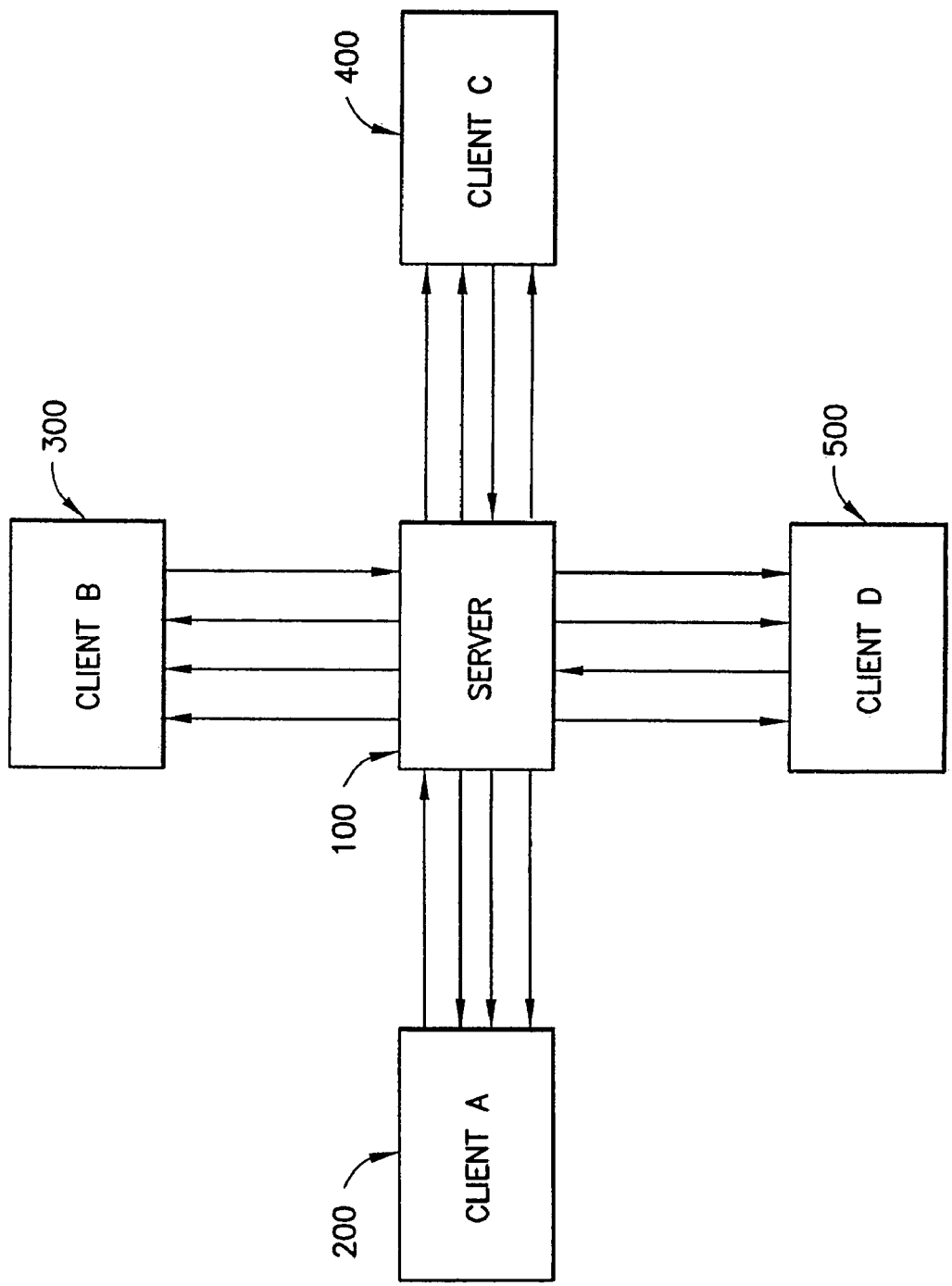
FIG. 2 is a schematic block diagram of a broadcast configuration of the present invention.

The configuration depicted in FIG. 1 provides for communication between scripts and data exchange between two computers, while the configuration depicted in FIG. 2 provides a "broadcast" configuration, in which a script on a first computer 200 can communicate and exchange data with a script on a plurality of computers 300, 400, 500.

A script 220 in accordance with the present invention may be written in any suitable programming language, such as a web-based scripting language like JavaScript or VBScript, as a routine matter of design choice. Once the script 220, 320 is downloaded to the respective computer 200, 300 from the server 100, the script 220, 320 is preferably loaded and running on the respective computer 200, 300 when a user of the computer activates an Internet browser program (i.e., a program, typically resident on the user's computer, that facilitates navigation of the Internet using Internet addresses (urls)). One way to load the script 220, 320 is on a web browser through means of a web page that contains the script 220, 320.

The script 220, 320 contains a pointer or reference to a control 210, 310 that will be handling the communication of data between the script 220, 320 and the server 100. One implementation of this could be an HTML or DHTML based web page that loads an instance of the control 210, 310 by use of the "<OBJECT>" tag. This instance of the control 210, 310 can then be referenced in the script 220, 320 by use of its id, name or any other relevant application of the Document Object Model (DOM), as a matter of design choice within the scope of the teachings herein. With a pointer to the instance of the control 210, 310, the script 220, 320 can then call any exposed functions in the control 220, 320, and pass any necessary data from the script 220, 320 to the control 210, 310 as arguments. The present invention thus enables a script running in a web browser on one computer to manipulate the DOM of a web browser on another computer. For example, a first script 220 on a first computer 200 can send a command to a second script 320 on a second computer 300 instructing the second script 320 how to manipulate the DOM of its particular web browser window. One example of this might be to control the browser display on a second computer to display a certain ad by inserting an <IMG> tag into the DOM of the web page to which the user of the second computer has navigated. The first script 220 would simply send data to the second script 320 instructing the second script 320 to insert a specific image into the DOM of the respective web browser window. That functionality and level of communication between scripts of different computers, and control by a script on one computer over a script on another computer, has heretofore not been available.

The form and type of the data sent from one script to another script can vary based on the application. For example, it might be suitable to send the data in an XML format where each piece of data is broken up as an XML element. The types of data sent could be a defined class, an instance of an object (class), a function call and its appropriate arguments, a data structure, etc.

A control 210, 310 may be software or computer code, written in any art-recognized programming language, such as for example, C, C++ or Java. A control 210, 310 may be downloaded from the server 100 to each computer 200, 300 upon which a script 220, 320 in accordance with the present invention is loaded (i.e., stored in memory (permanent or temporary) and running. In a preferred embodiment, the control is an ActiveX control (the term "control" being user herein to also include an ActiveX control). An instance of the control 210, 310 may be created (loaded into a certain memory location) and the script 220, 320 maintains a pointer to that instance (memory location). The control 210, 310 has access to certain functions and thus may expose those functions, such as those made available to other applications via a COM interface(s). In accordance with the present invention, those functions exposed by the control may be called by the script 220, 320. Advantageously, the present invention thus provides access by the script 220, 320 to functionality (i.e., the function(s) exposed or made available by the control 210, 310) that the script 220, 320 cannot access. One example of such a function might be one that receives data from the script 220, 320, then passes the data to the server 100, to be subsequently forwarded onto other script(s) on other computer(s). Another example might be a function in the control 210, 310 that returns a pointer to the an interface such as, for example, the IWebBrowser2 interface for the main Internet browser window, to the script 220, 320. By using a control in conjunction with a script in accordance with embodiments of the present invention, the script 220, 320 has access to data to which the control 210, 310 also has access. In the previous example, that data to which the script 220, 320 now has access is in the form of an object that the script 220, 320 cannot ordinarily access. Currently in DHTML, there is no way for a script to access the IWebBrowser2 interface for an Internet window. However, if a control is loaded, say as a Browser Helper Object (BHO), the control can access a pointer to the IWebBrowser2 interface, and later pass this pointer to the script if requested. The foregoing provides an example of how the present invention utilizes the control to provide script access to control data and functionality. Control data may thus be communicated from the control to the script (and from the script to the server and onto another control and script, as described in more detail below).

The control 210, 310 can also call a function(s) in the script 220, 320 and pass data to the called function in the script. One method of accomplishing this might be for the control to obtain a pointer to the IHTMLWindow2 interface of the window that the script/control is loaded in, and then call "execScript" on that pointer to execute the function provided by that script. Another method could be for the control 210, 310 to get a pointer to the IHTMLDocument2 interface of the document the script/control is loaded in and then call "get_Script" functionality of the script to retrieve a pointer to an IDispatch interface that receives a handle to the script engine. With the pointer to that IDispatch, "Invoke" may be called on that pointer to call the desired function in the script. One example of the control calling a function in the script might be when the control receives data from the server that needs to then be forwarded to the script. The control can call a function in the script with the data passed as an argument.

In a preferred embodiment, the control 210, 310 is an ActiveX control that provides at least the following functionality: 1) enable data exchange between the server 100 and a script(s); 2) enable data exchange between scripts on different computers (with the data passing through the server 100); and 3) provide enhanced functionality to the script by providing access by the script to the data and functionality of the control.

In the illustrative, non-limiting examples of embodiments of the present invention described below and elsewhere herein, it is assumed that the script has loaded an instance of the ActiveX control in a manner known in the art (e.g., using the <OBJECT> tag, etc.).

If a script 220 desires to transmit data to the server 100, the script 220 would call the appropriate function exposed by the ActiveX control that enables data transmission by the ActiveX control to the server 100. For example, if a user of the first computer 200 desires to login to the server 100 (i.e., login to a particular web site, user group, etc.), the ActiveX control might expose a "Log In" function, which requires as data a username and password. A script 220 could call this "Log In" function, passing in as arguments a username and password to the function. Via the ActiveX control, the "Log In" function then calls the appropriate function on the server 100, e.g., a "Server Log In" and passes the username and password received from the script 220 to the "Server Log In" function. The "Server Log In" function then logs the user in to a predetermined group (e.g., a group of registered users for a particular web-site, a synchronization group (as described in more detail below), etc.). The server 100 can also transmit data to the script 220 by calling the appropriate exposed function in the ActiveX control 210. Continuing with the "login" example, the server 100 may transmit a notification to the script 220 that the user who requested a login, has indeed been logged in. The ActiveX control 210 might expose a "Log In Event" function which requires a Boolean value of true or false to indicate whether or not the user has been logged in. The server 100 would call this function and pass the value true to it when the user has been logged-in. The "Log In Event" function then calls an appropriate function in the script 220 (by using "execScript" or "Invoke", for example), such as a "Script Confirm Login", and passes the value true to the "Script Confirm Login" function. Login confirmation may then be displayed to the user of the first computer by the script 220.

In addition to communication between a script and the server 100, the present invention also enables communication (i.e., data exchange) between two or more scripts loaded and running on two or more computers, such as depicted in FIG. 2.

An application programming interface (API) enables communication between scripts 220, 320 provided on different computers 200, 300. Communication between scripts 220, 320 is implemented by an ActiveX control provided on both computers 200, 300. Preferably two classes are implemented in the ActiveX control of the present invention to handle the sending of data from one script 220 (i.e., the calling script) to another script(s) 320 (i.e., the receiving script(s)); more precisely, the calling of a function in a script on another computer. The RemoteConnection class represents a connection between the calling script 220 and the receiving script(s) 320 (see, e.g., FIG. 1), and is responsible for managing the receiving script(s), as well as managing the communication of data from the sending script to the receiving script(s). It should be noted that either script 220, 320 depicted in FIG. 1 may be the calling script, and the description of script 220 as the calling script is merely an illustrative, non-limiting example of an embodiment of the present invention. The RemoteConnection class is responsible for managing the receiving script(s), as well as sending the data to the receiving scripts. The RemoteConnection class exposes: an "AddId" function, which allows the calling script to add identifiers for script(s) (i.e., computers) to receive data from the calling script; a "RemoveId" function which allows the calling script to remove identifiers for script(s); a "BatchMode" function which allows the calling script to turn on a batch send mode, allowing multiple function calls to get sent in one request (such as for a configuration as depicted in FIG. 2); a "SendBatch" which actually sends the batch request; and a "RemoteInterface" function which allows the script access to a RemoteInterface object, such as a function in a control on the remote computer. The "RemoteInterface" class represents a pointer to the receiving script(s), and is responsible for organizing the data (function call and arguments) into a data structure to be sent to the receiving script(s), and forwarding the function call to the RemoteConnection instance (which then sends this data to the receiving scripts). When an instance of the RemoteConnection class is created, it in turn creates an instance of the RemoteInterface class. When the script calls a function in another script, it accomplishes this by calling that function on the RemoteInterface object pointer. For example if a first script 220 on a first computer 200 wanted to call the "SendMessage" function in a second script 320 on a second computer 300, the first script 220 would call the "SendMessage" function on the RemoteInterface object pointer, which might be in the form of: RemoteInterfacePtr.SendMessage(msg).

The RemoteInterface object is a COM object that is derived from the IDispatch interface. The "GetIDsOfNames" function and the "Invoke" function in the RemoteInterface class are overloaded. When the script calls the "SendMessage" function on the RemoteInterface, the "Scripting Object" (the object that contains the code for running and/or interpreting the scripting language and is the interface between the script and the application the script is contained in (e.g., browser, MS Office, etc.)) makes a request to the control's RemoteInterface object "GetIDsOfNames" function (also overloaded), and asks for the dispid associated with the "SendMessage" call. The overloaded "GetIDsOfNames" creates a new dispid (unless it has one available from an earlier call to SendMessage) and sends it back to the "Scripting Object" which the "Scripting Object" then uses to call the control's RemoteInterface object's "invoke" method (also overloaded). The dispid is passed to the control's "invoke" so the control knows that the request was for the "SendMessage". The control's "invoke" then creates a data structure that represents the call to "SendMessage" and all of its arguments and passes this to the receiving script (via the server). When the data is received by the receiving ActiveX control(s), these recipient controls must parse the data structure they have received, and then pass this data onto their respective scripts (calling the appropriate function(s) in the script with the associated arguments).

With general reference to FIG. 1, the following illustrative and non-limiting example will illustrate how a first script 220 loaded and running on a first computer 200 can call a function in a second script 320 loaded and running on a second computer 300, e.g., if the first script 220 (Script A) desires to call the "Send Message" function on the second script 320 (Script B). Script A calls the "NewRemoteConnection" function exposed by the ActiveX control 210 (Control A) on the first computer 200. That function creates an instance of the RemoteConnection class, and returns a pointer to this instance to Script A, which then calls the "AddId" function on the RemoteConnection instance pointer and passes in the identifier of the user on the second computer 300. The "AddId" function adds this identifier to a list of recipients identifiers (i.e., scripts that are going to receive the function call). Script A then calls the "RemoteInterface" function on the RemoteConnection instance pointer. The "RemoteInterface" function returns a pointer to an instance of the RemoteInterface class to Script A, which then calls the "SendMessage" function on the RemoteInterface pointer. The "GetIdsOfNames" of the RemoteInterface object is called and a unique identifier is generated and used to fill the "rgdispid" parameter passed to the "Scripting Object" with the generated unique identifier. In a global map, the function name is mapped to the unique identifier. The "Invoke" function gets called, and the "Scripting Object" uses its map to find the function name that corresponds to the "dispidMember" parameter passed to the "Scripting Object". RemoteInterface object then creates an XML data structure with this function name, and its arguments, which are passed to the "invoke" call of the RemoteInterface. The data structure is passed to the RemoteConnection instance, which then passes it to Script B via the server 100. When the data is received by the recipient ActiveX control on second computer 300, this control parses the XML feed it has received, and then passes this data onto Script B by calling the "SendMessage" function and passing on the appropriate arguments. Here is what the code in Script A might look like:

var conn=xxx.NewRemoteConnection( );
    conn.AddId("user2");
    var iface=conn.RemoteInterface( );
    iface.SendMessage("Hello!");

The script 220 operates in a "sandbox" and is thus limited in what it can do. The control 210 gives the script 220 access to data and functionality to which the script 220 would otherwise not have access. The functionality provided by the ActiveX control to the script(s) is a routine matter of design choice. Any functionality that may be provided via an ActiveX control may be provided to the script in accordance with the present invention. For example, a control can be loaded as a Browser Helper Object (BHO), access a pointer to the IWebBrowser2 interface, and later pass that pointer onto the script if requested by the script. The ActiveX control could implement a BandObject class, whereby a script could call functions on the ActiveX control to create different types of band objects. The ActiveX control could implement a local storage class and allow the script secure read/write access to certain local files on the user's computer. These are some examples of functionality unavailable to the script alone, but could be provided to it with the use of an ActiveX control in accordance with the present invention. It will be obvious to persons skilled in the art and from the disclosure provided herein that other functionality may be made available to a script by a control in accordance with the embodiments of the present invention.

In another embodiment of the present invention, a first computer can control the Internet navigation of a second computer. The two (or more) computers are "synchronized" so that as a user of the first computer navigates the Internet from one web page to another, the second computer (i.e., the Internet browser installed on and operable in connection with the second computer) is caused to navigate the Internet to those same web pages. This embodiment of the present invention enables a user of a first computer to login to a synchronization group maintained in a database on the server 100, and to synchronize with a user of a second computer. If the user of the second computer agrees to synchronize with the user of the first computer, navigation of the Internet by the second user is controlled by the navigation of the first user. In addition, this embodiment of the present invention enables users who are "synched" to send instant messages to one another. Although the following description is directed to an embodiment where only a first and second user are synchronized, the present invention is not so limited and applies to any number of computer users, i.e., any size synchronization group.

Referring next to FIGS. 3-12, an embodiment of the present invention that enables a user of a first computer to synchronize with a user of a second computer will now be discussed in detail. When Internet browser (e.g., Microsoft™ Internet Explorer, Netscape Navigator®) is loaded, a browser window 1000 (FIG. 7) is displayed on the first user's computer display. That browser window 1000 provides an address window 1010 which displays the Internet address (i.e., url) of the Internet web page which is currently displayed in the browser window 1000. That window 1010 also enables the user to enter a different Internet address and display a different Internet web page. The Internet browser formats and displays the content from each Internet web page on the display of the user's computer. When the user causes the Internet browser to load the browser window 1000 (which occurs when the user activates the Internet browser (e.g., by clicking on an icon on the Windows desktop) and connects to the Internet using a particular Internet browser), the present invention causes an explorer bar 1100 to be displayed (i.e., overlayed) over the browser window 1000 as an HTML page.

Figure 3:
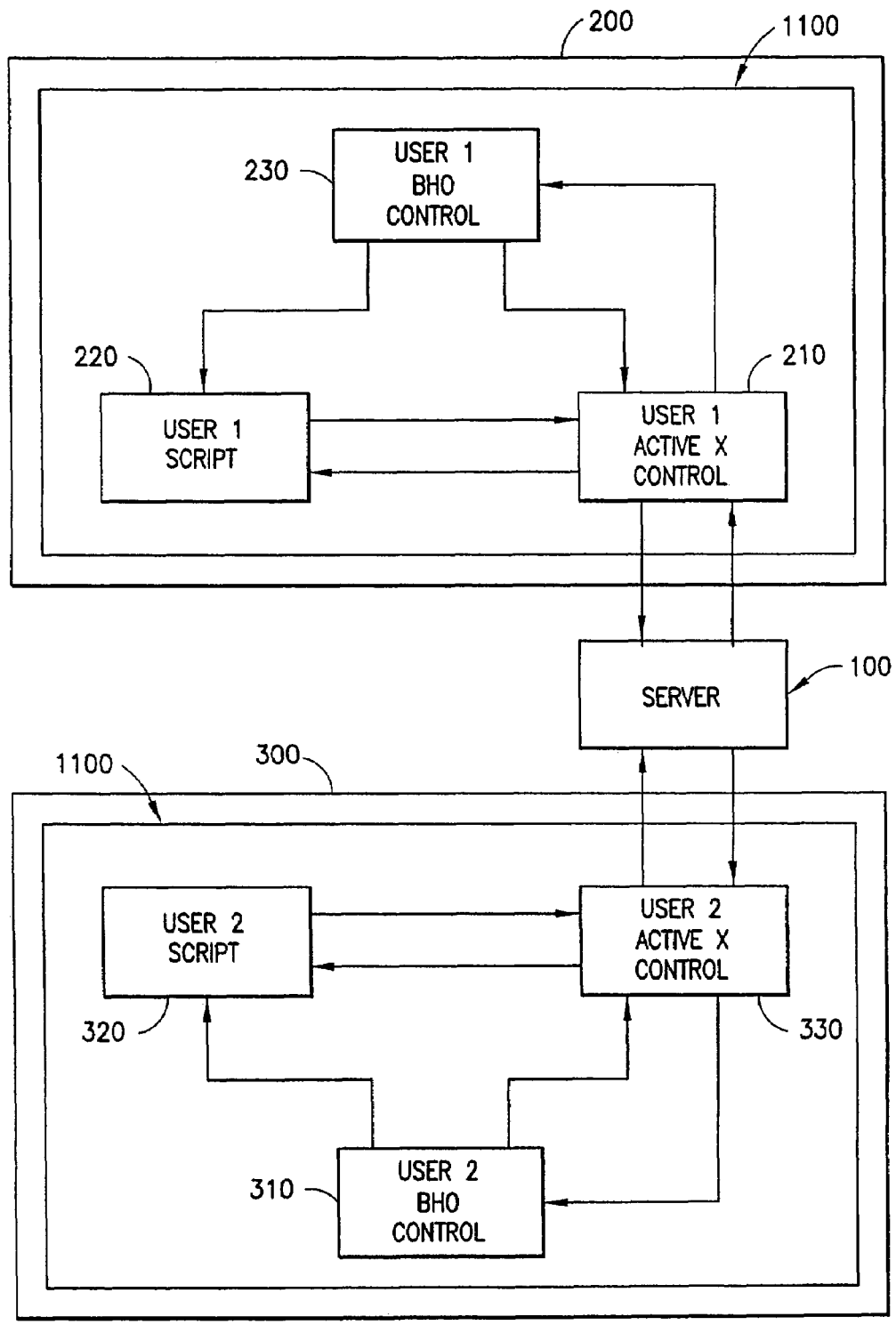
FIG. 3 is a schematic block diagram of a first and second computer connectable to each other via a server and each having an explorer bar displayable in an Internet browser window and having script, a control, and a browser helper object (BHO) in accordance with an embodiment of the present invention.
Figure 7:
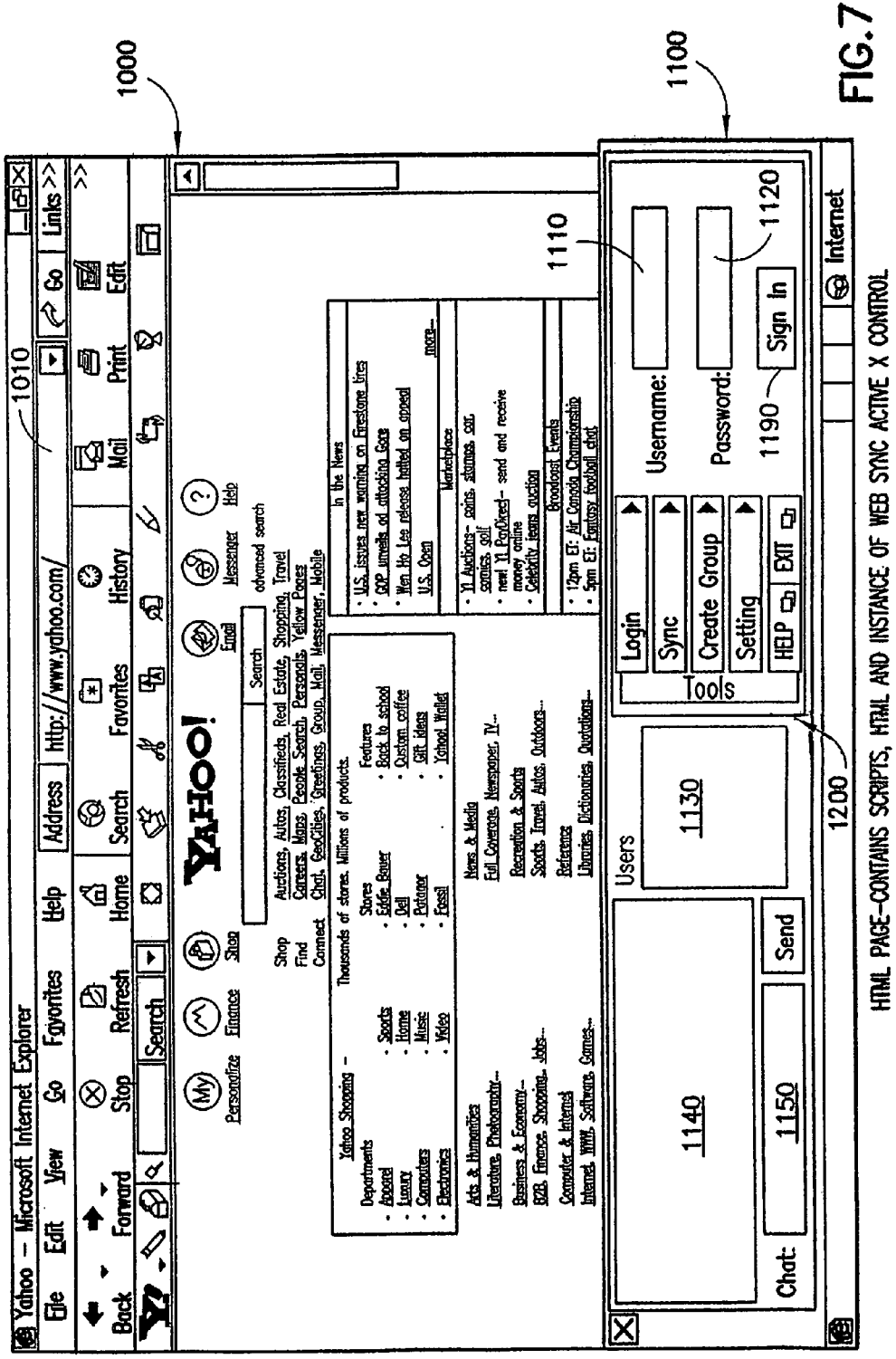
FIG. 7 is a view of an Internet browser window having an explorer band provided in accordance with an embodiment of the present invention and overlayed on the browser window.
Figure 8:
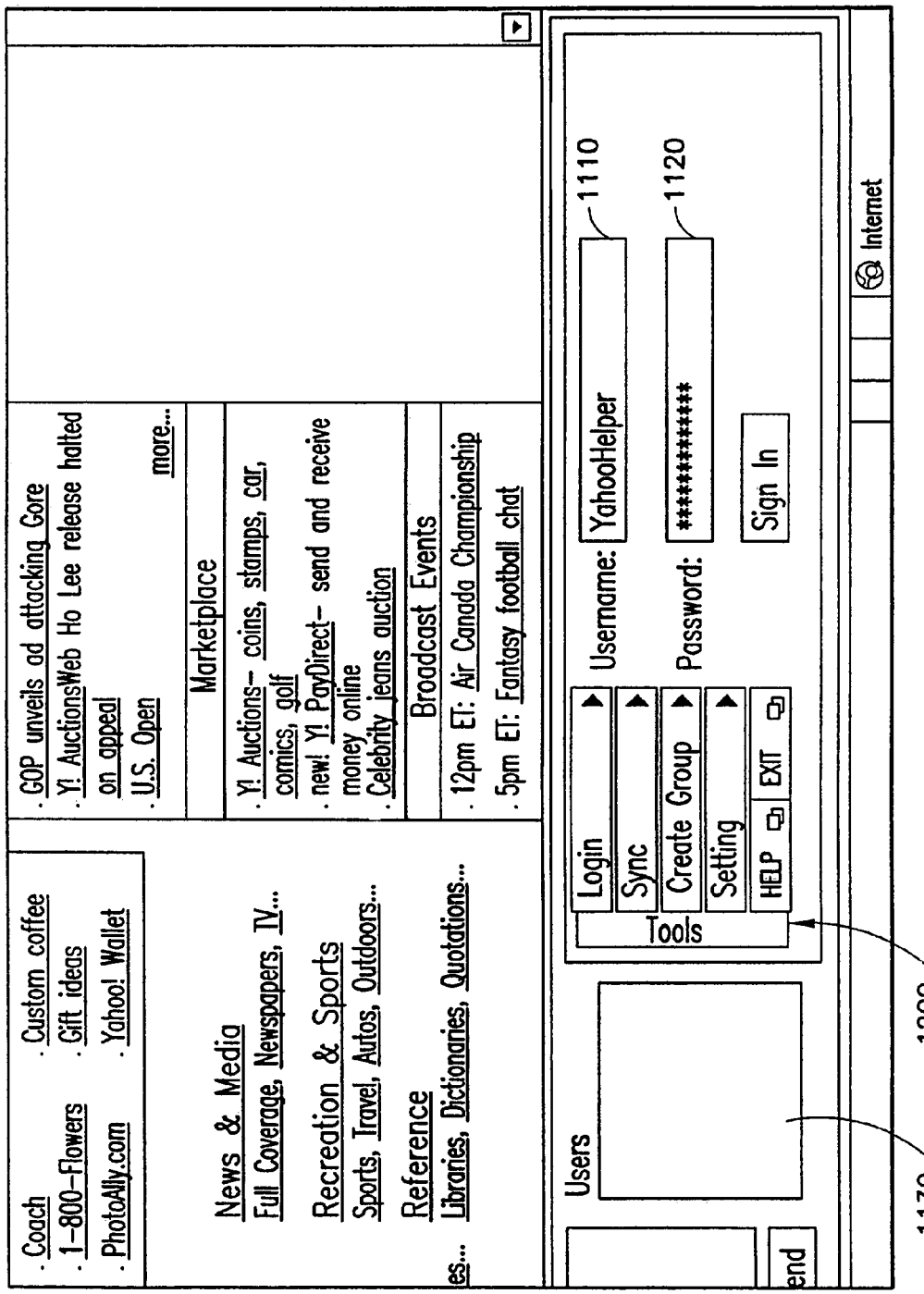
FIG. 8 is a detailed view of the explorer band depicted in FIG. 7.

As depicted in FIG. 3, the explorer bar 1100 contains a script 220, browser helper object (BHO) control 230, and an instance of an ActiveX control 210. The script 220 provides the look and feel of the explorer bar 1100, as depicted in FIG. 7, for example, including defining a username window 1110, a password window 1120, a login status window 1130, an instant message receive window 1140, an instant message send window 1150, a tools area 1200 having a plurality of pull-down menus (e.g., login, sync, create group, settings, help and exit), and a sign in button 1190. It will be obvious to persons skilled in the art that explorer bar 1100 of the present invention may be configured for various other displays and provide various other additional functionality, as a routine matter of design choice. However, enabling a first user to synchronize with a second user so as to enable control of Internet navigation of the second user by the navigation of the first user is a novel and unobvious part of the present invention and that is not merely directed to the look and feel of the explorer bar 1100. In addition, the instant message capability provided in accordance with the present invention is also a novel an unobvious part of the present invention.

The BHO control 230 can access the DOM of the Internet browser window 1000, which provides access for the script 220 to data not typically accessible by a script. Thus, data may be communicated between the script 220 and the BHO control 230 to the browser window DOM so that the script 220 effectively communicates directly with the browser window DOM.

The explorer bar 1100 (which may be an HTML page) has an "<OBJECT>" tag that creates an instance of the ActiveX control 210 (which is in the form of a dll). Once the explorer bar 1100 is loaded, the script 220 is loaded (more than one script may also be loaded, as a routine matter of design choice), the ActiveX control 210 is created and is now accessible by the script(s). The interrelationship between and among the various components of the explorer bar 1110 are depicted in FIG. 3.

Figure 4:
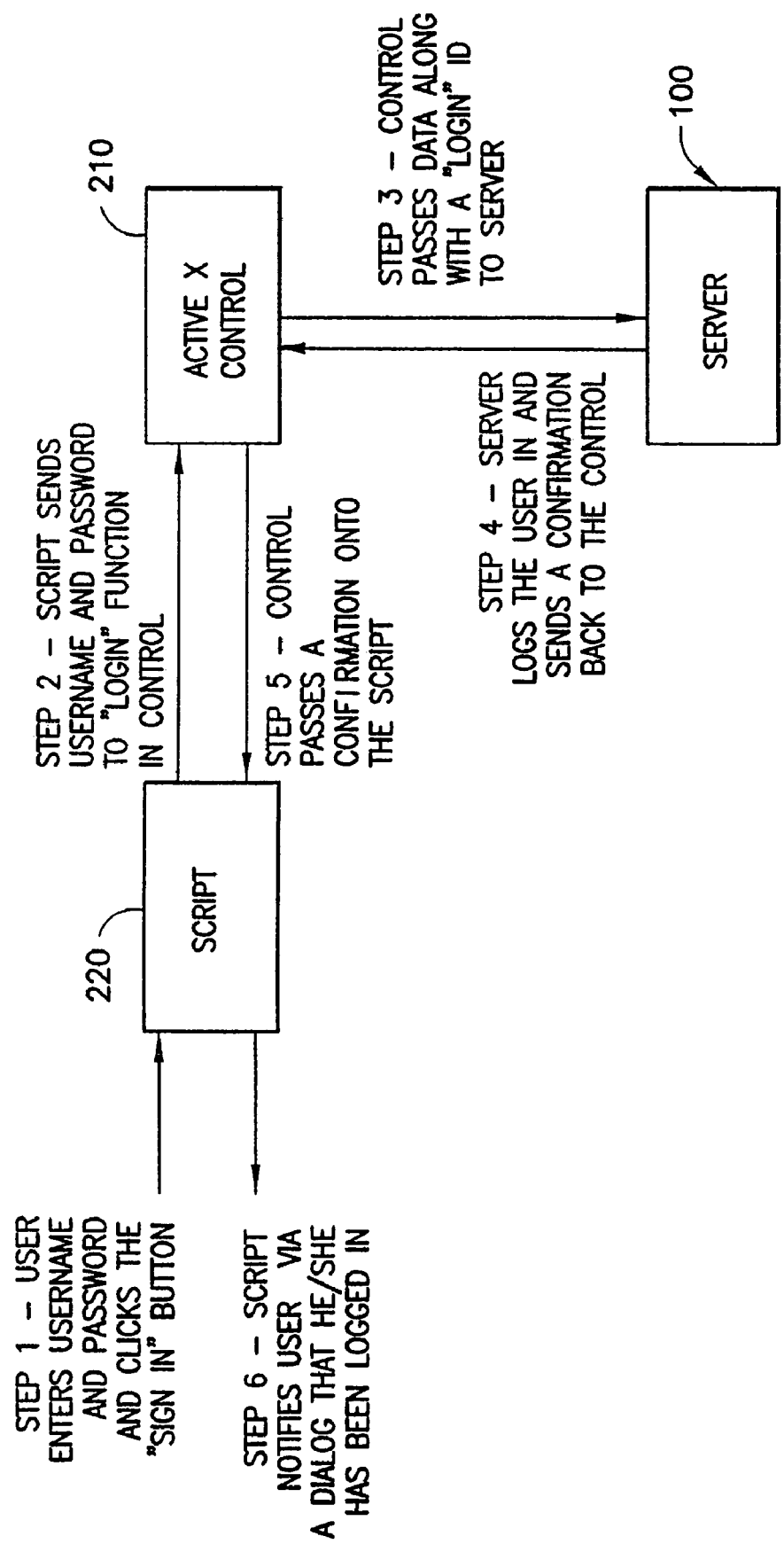
FIG. 4 is a flow diagram depicting the steps carried out in accordance with an embodiment of the present invention for a login request initiated by a user of the first computer.
Figure 9:
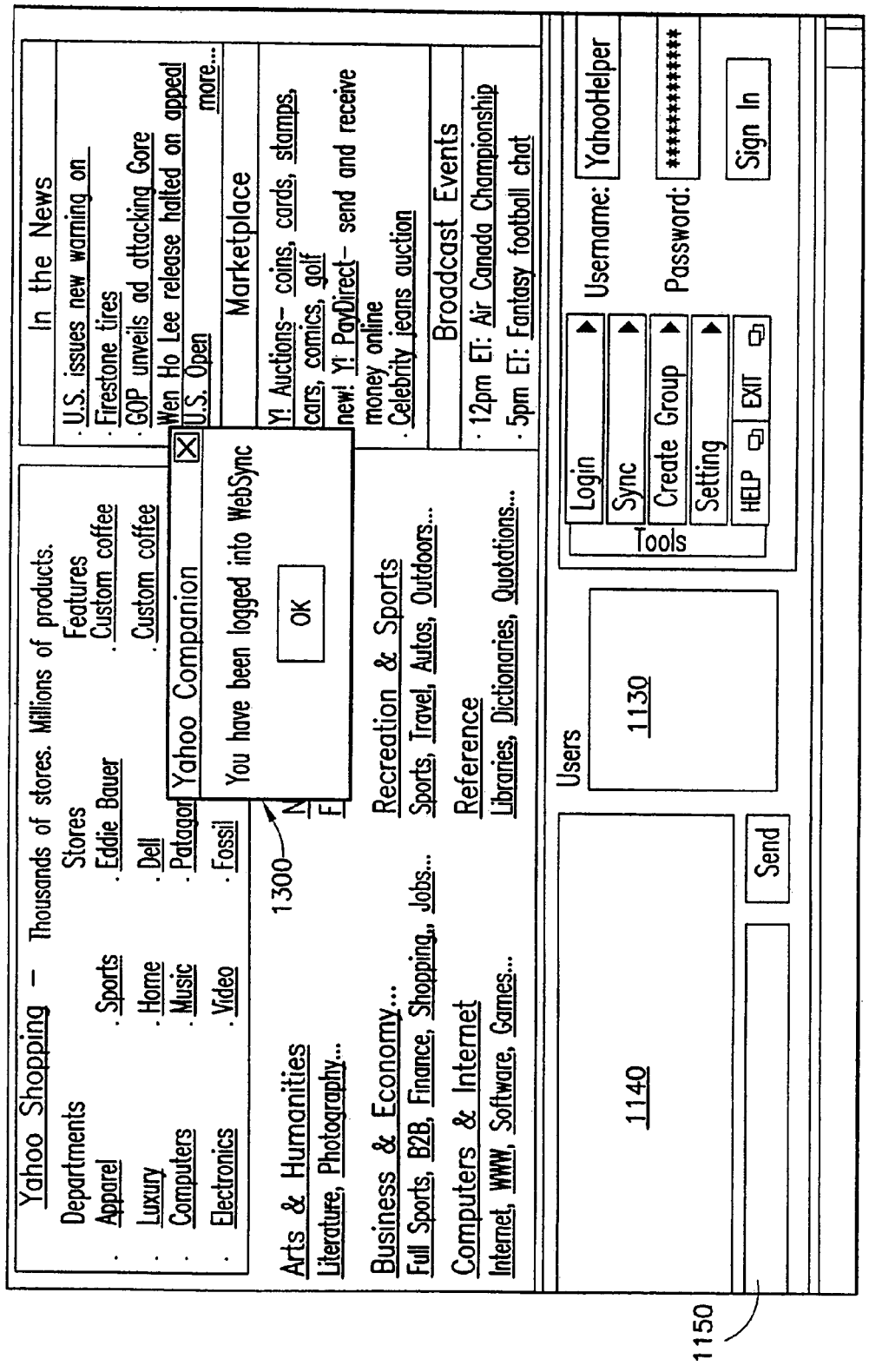
FIG. 9 is a view of the Internet browser window depicted in FIG. 7 and showing a login confirmation/rejection message provided in accordance with an embodiment of the present invention.

To synchronize the Internet navigation of two (or more) computers in accordance with an embodiment of the present invention, each user must first login to a synchronization group defined in a database of the server 100. Login is facilitated by the explorer bar 1100, namely, via the username and password windows 1110, 1120, and the sign in button 1190. The login process is depicted in FIG. 4. After entering a username and password and selecting (i.e., clicking) the sign in button 1190, as in step 1, the script 220 sends the user username and password as arguments to the login function in the ActiveX control 210, as in step 2. The ActiveX control 210 receives the user identification and password data from the script 220, and transmits that data to the server 100 along with a login identification to notify the server 100 that the data being transmitted is a request to login, as in step 3. The server 100 receives the data from the ActiveX control 210 and, from the login identification, determines the data is a login request. Using the username and password data, the server 100 either confirms or rejects the login request (confirms if the username and password are found in the database provided on the server 100, e.g. a login database, or rejects the request of the username and/or password are not found). The server 100 then transmits a login confirmation or rejection to the ActiveX control 210, as in step 4. Finally, the ActiveX control 210 passes the confirmation or rejection to the script 220, as in step 5, so that the script is informed that the user has been logged in. The script 220 notifies the user that whether the login request has been confirmed or rejected, as in step 6, and displays that via a login response message 1300, as depicted in FIG. 9. The above-described login sequence and procedure may be carried out by any number of users via any number of user computers. Thus, although FIG. 1 depicts a two-user/computer configuration, and FIG. 2 depicts a four-user/computer configuration, they are provided as illustrative, non-limiting examples of two embodiments of the present invention.

Figure 5:
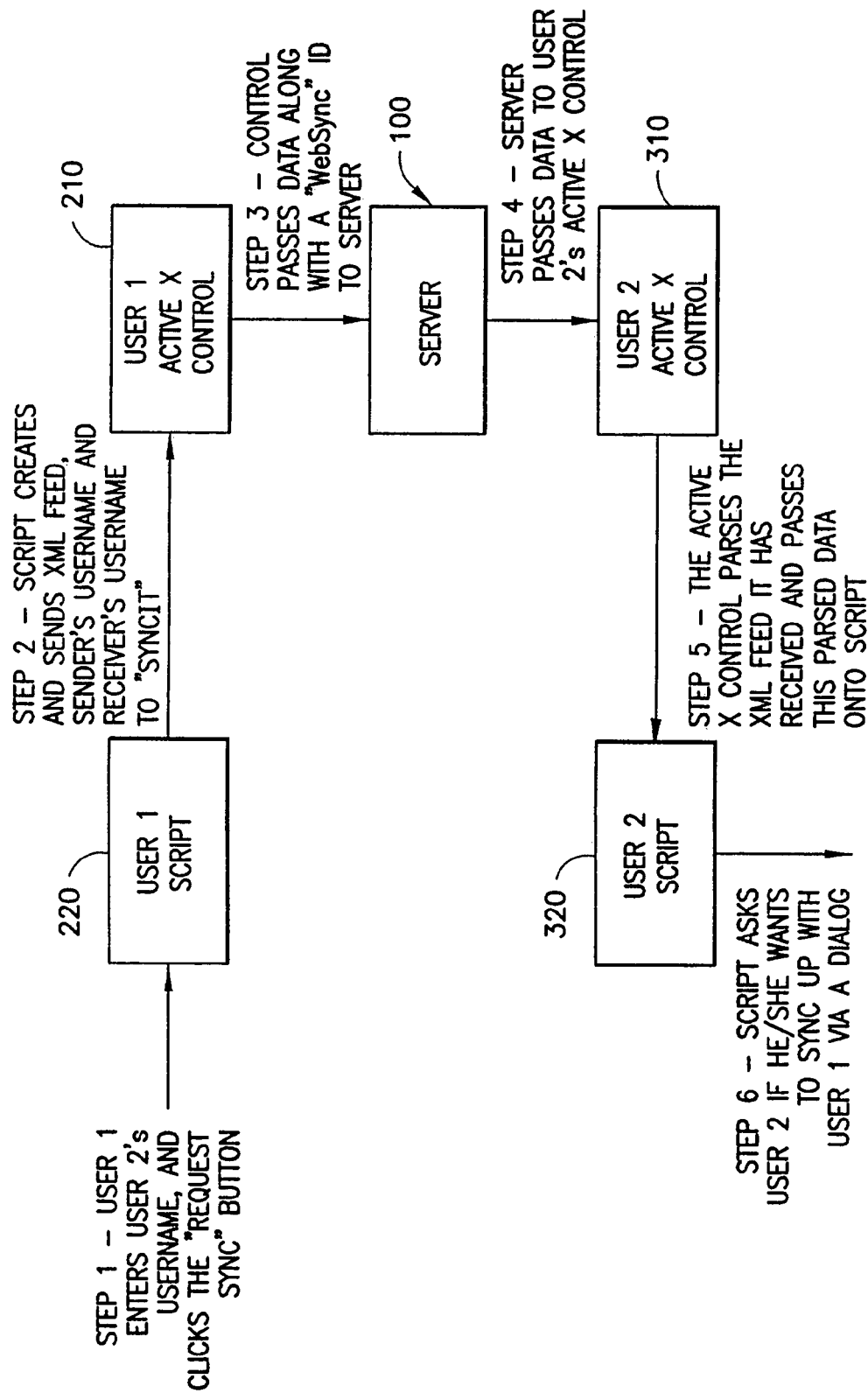
FIG. 5 is a flow diagram depicting the steps carried out in accordance with an embodiment of the present invention for a synchronization request initiated by a user of the first computer.
Figure 6B:
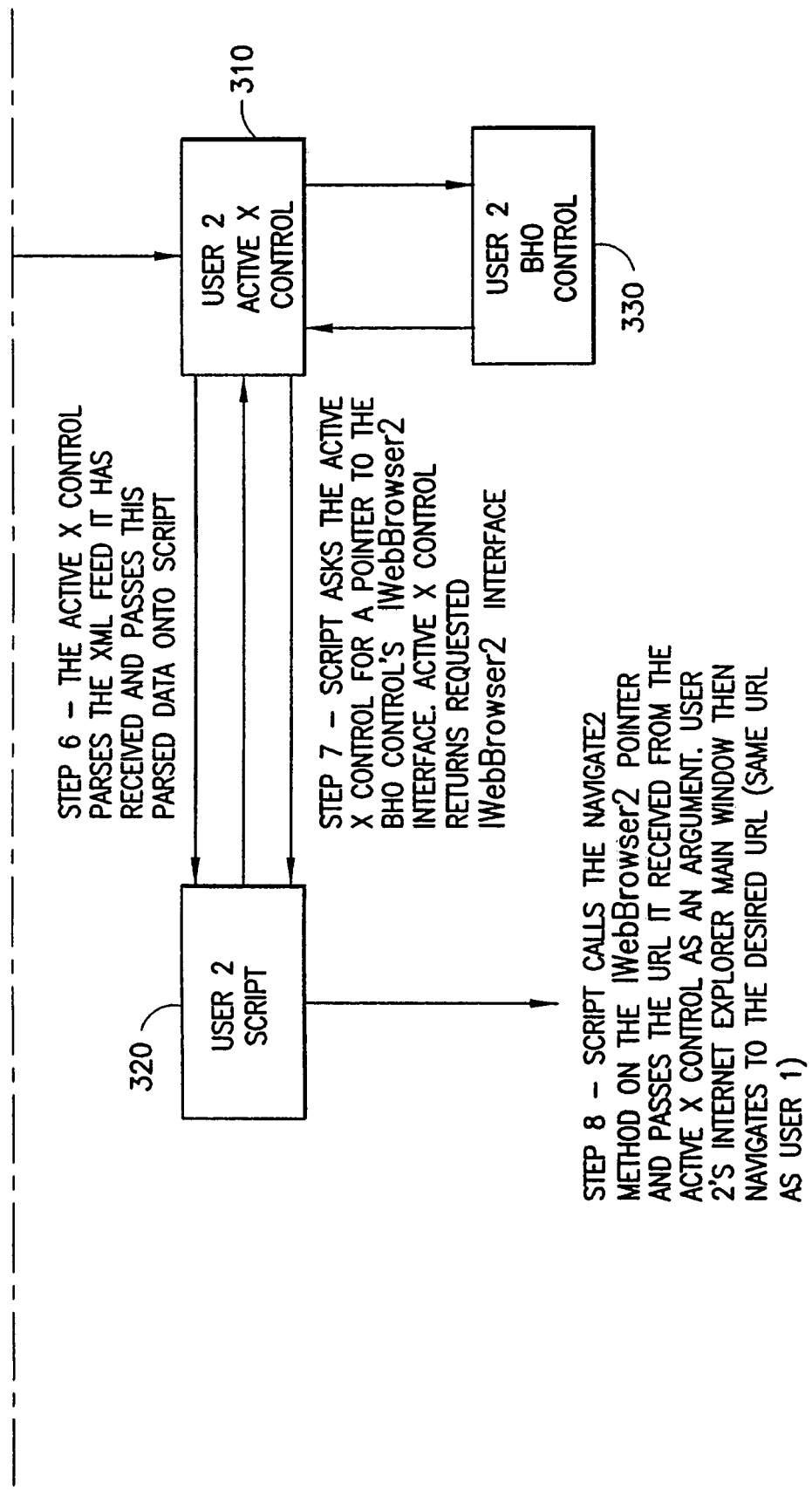
FIG. 6 is a flow diagram depicting the steps carried out in accordance with an embodiment of the present invention for a navigation control by a user of the first computer for a user of the second computer.
Figure 10A:
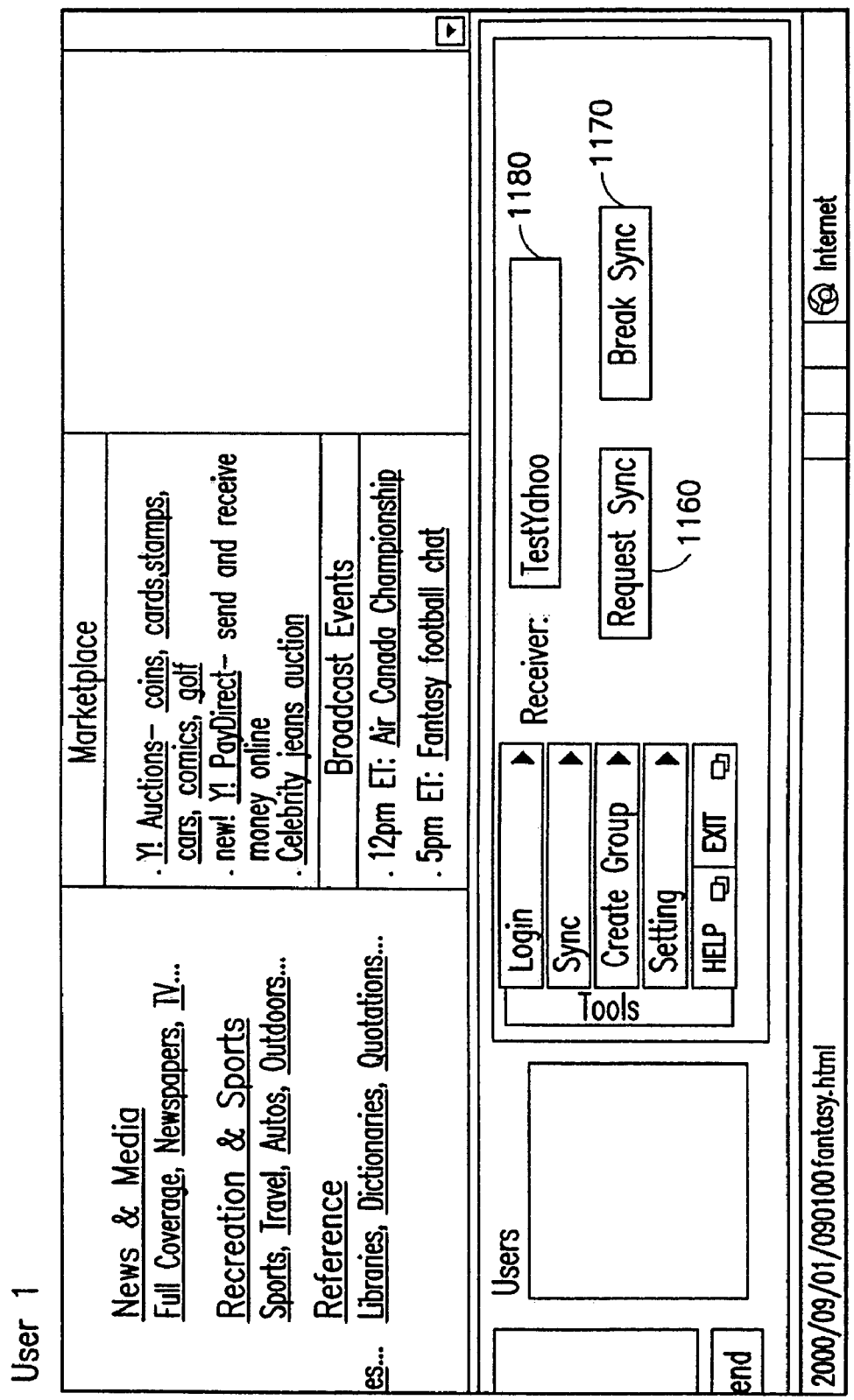
FIGS. 10A and 10B respectively depict the view of the Internet browser of a first user requesting synchronization with a second user, and a synchronization request message displayed in the second user's Internet browser window in accordance with an embodiment of the present invention.
Figure 10B:
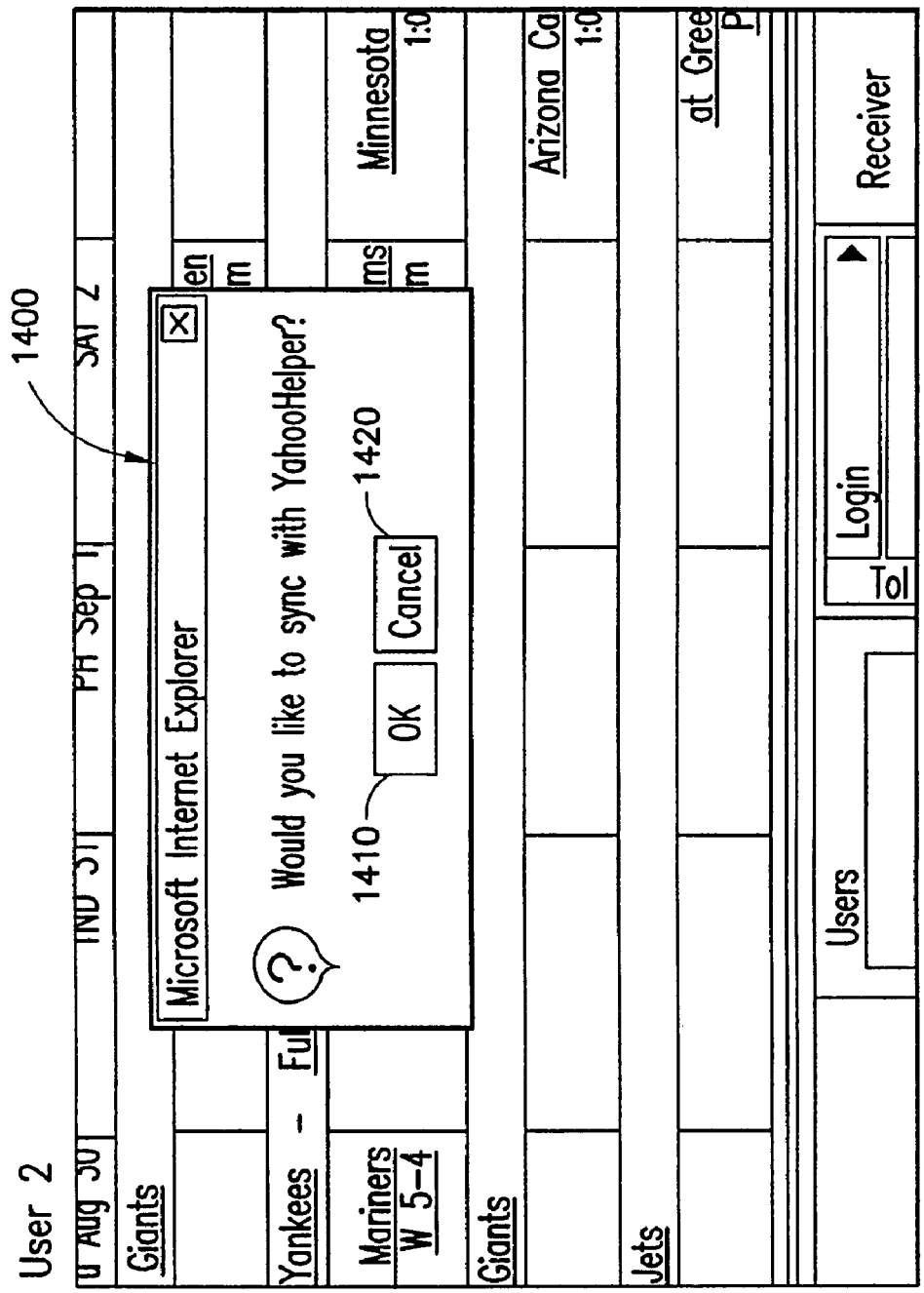

To enable synchronization of Internet navigation in accordance with an embodiment of the present invention, each user must login, using the sequence and procedure described above. Once each user has been logged in, one user (User 1) may be the "leader" and control the Internet navigation of the other user(s), i.e., lead the other user (User 2). User 1 does this by requesting to sync with User 2, as depicted in FIG. 5 and FIGS. 10A and 10B. After User 1 enters User 2's username as a receiver in a receiver window 1180, and selects a Request Sync button 1160, as in step 1 (FIG. 5), the script 220 creates an XML feed to package the data (e.g., user 1 name, user 2 name) to be sent onto User 2 as in step 2. The XML feed may have the following format:

```
<XML>
<DATA>
<SENDER>User 1's username</SENDER>
<SYNC>User 2's username</SYNC>
<DATA>
</XML>
```

This XML feed, along with the sender's username (User 1's username) and the receiver's username (User 2's username), are passed to a synchronization function in the ActiveX control 210, as in step 2 in FIG. 5. The ActiveX control 210 receives that data and transmits it to the server 100 along with a synchronization identification to notify the server 100 that the transmitted data is a synchronization request, as in step 3. From the synchronization identification, the server 100 identifies the data as a synchronization request, and transmits that request to User 2, provided that User 2 has previously logged in. More specifically, the server 100 passes the synchronization request to User 2's ActiveX control 310, as in step 4. User 2's ActiveX control 310 parses the XML feed it has received from the server 100 and passes this parsed data to a script 320, as in step 5. The script 320 analyzes the data, and realizes that it is a request to synchronize with User 1. Based on this, User 2's script 320 then displays a synchronization request message 1400, as depicted in FIG. 10B and as in step 6 of FIG. 5.

Figure 11A:
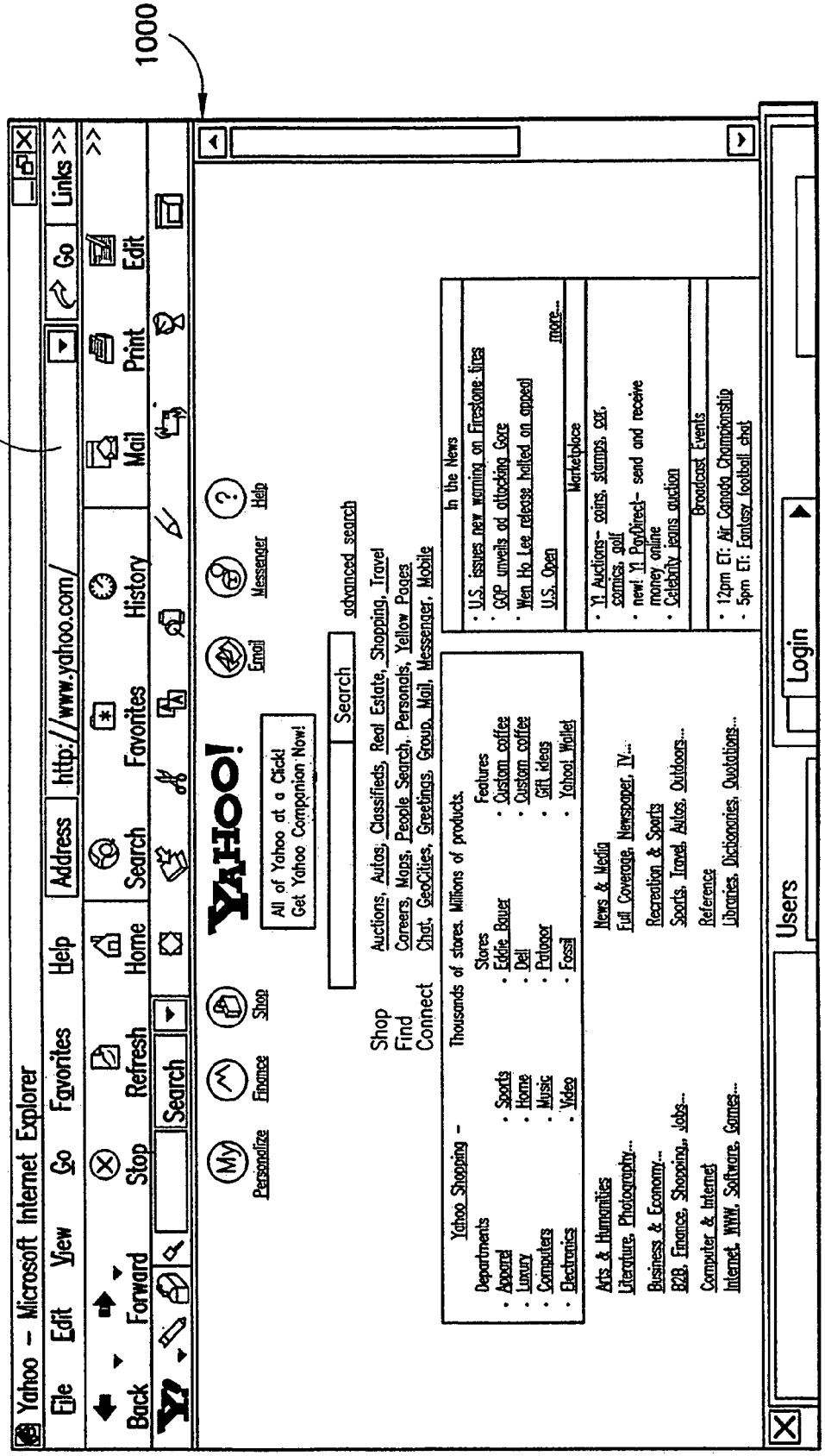
FIGS. 11A and 11B respectively depict navigation by a first user from a first Internet site to a second Internet site.

If User 2 has agreed to synchronize with User 1, by selecting the OK button 1410, wherever User 1 navigates on the Internet using his/her Internet browser, User 2 will follow, i.e., User 2's Internet browser will be caused to navigate to the same Internet web pages as User 1. Controlling the navigation of User 2 by User 1's navigation is depicted in FIG. 6 and FIGS. 11A, 11B, 12A and 12B. User 1 first navigates to a web page, such as depicted in FIG. 11A. The browser helper object (BHO) control 230 provided on User 1's computer receives a NavigateComplete2 message from Internet browser because the main Internet browser window has navigated to a new web page, as in step 1 of FIG. 6. The BHO control 230 also receives arguments with the NavigateComplete2 message (such as the dispatch id, url, etc.). The BHO control 230 generates a navigation identification and passes that identification and the arguments received with the NavigateComplete2 message to a script 220. The script 220 then extracts any data it needs from these arguments (such as the url, etc.) and creates an XML feed to package the data it needs to send to User 2, as in step 3 in FIG. 6. The XML feed may have the following format:

```
<XML>
<DATA>
<SENDER>User 1's username</SENDER>
<URL>Url</URL>
</DATA>
</XML>
```

This XML feed, along with the sender's username (User 1's username) and the receiver's username (User 2's username) are passed to a synchronization function (e.g., "SyncIt") in the ActiveX control 210, as in step 3. The ActiveX control 210 receives that data and transmits it to the server 100 along with a synchronization identification (e.g., "WebSync" identification) to notify the server 100 that the data being transmitted is synchronization data. The server 100 receives the data and synchronization identification and interprets the data as synchronization data. The server 100 transmits the data to User 2's computer 300 via the ActiveX control 310, as in step 5 of FIG. 6. User 2's ActiveX control 310 parses the XML feed it has received from the server 100 and passes this parsed data (the url, etc.) to a script 320, as in step 6 The script 320 analyzes the data, and identifies it as synchronization data. Based on this, the script 320 then queries the ActiveX control 310 for a pointer to the BHO control's IWebBrowser2 interface (this is necessary because the script 320 does not have access to the IWebBrowser2 interface), as in step 7. In order to cause User 2's Internet browser to navigate to the url at which User 1 has navigated, it is necessary to obtain the main Internet browser window's IWebBrowser2 interface, to which the BHO control 330 has access. To achieve this, it is necessary to use the ActiveX control 310 as an intermediary between the script 320 and the BHO control 330, because the script 320 only has a pointer to an instance of the ActiveX control 310, not a pointer to the BHO control 330. It should be noted that the script 320 could have obtained a pointer to the BHO control 330 by requesting a pointer directly from the ActiveX control 310. Once the IWebBrowser2 pointer has been returned to the script 320 by the BHO control 330 via the ActiveX control 310, the script 320 calls the Navigate2 method on the IWebBrowser2 pointer and passes the url it received from the ActiveX control 310 as an argument, as in step 8. User 2's Internet browser window is then caused to navigate to the same url to which that User 1 navigated.

Figure 11B:
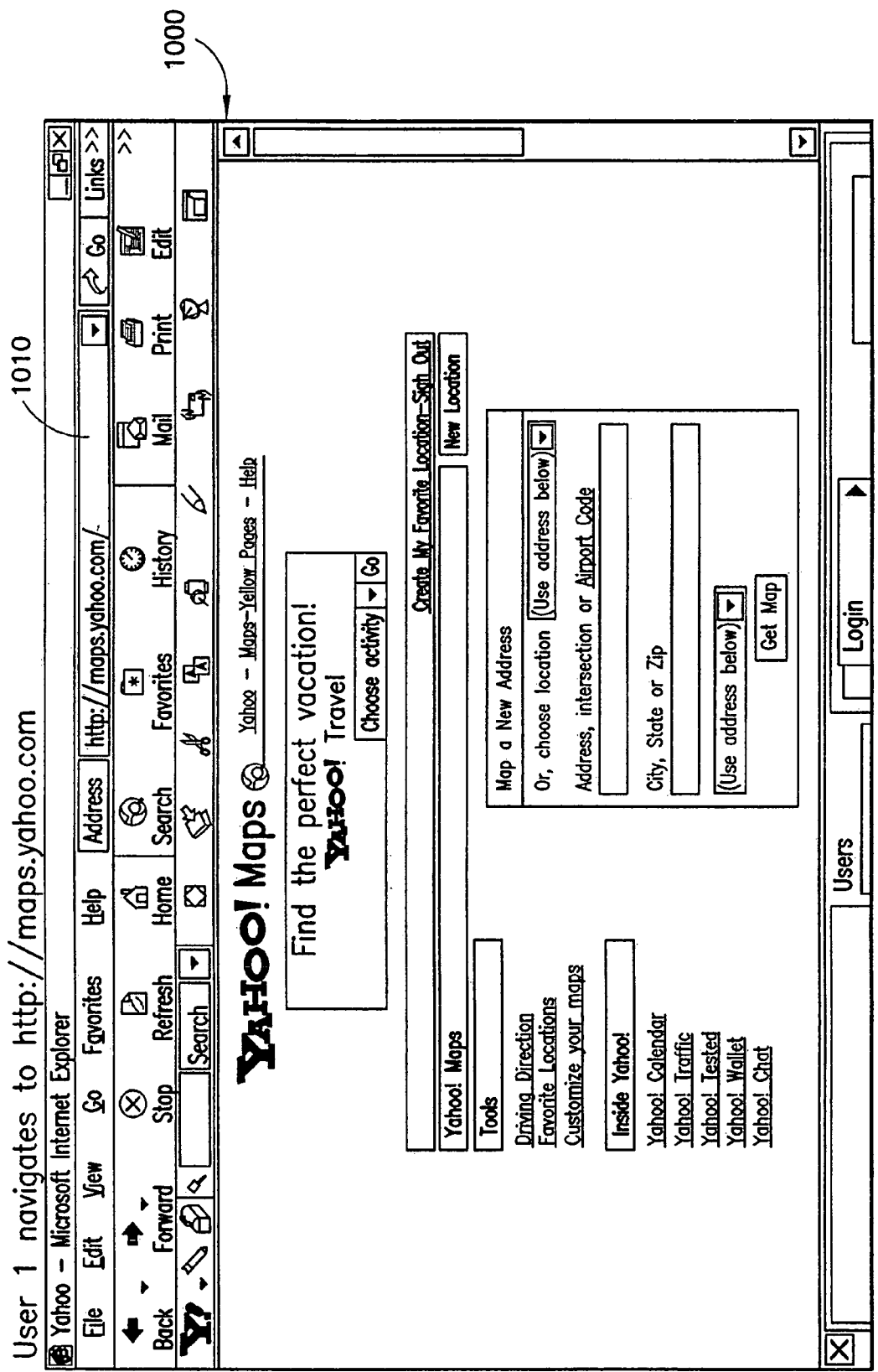
Figure 12A:
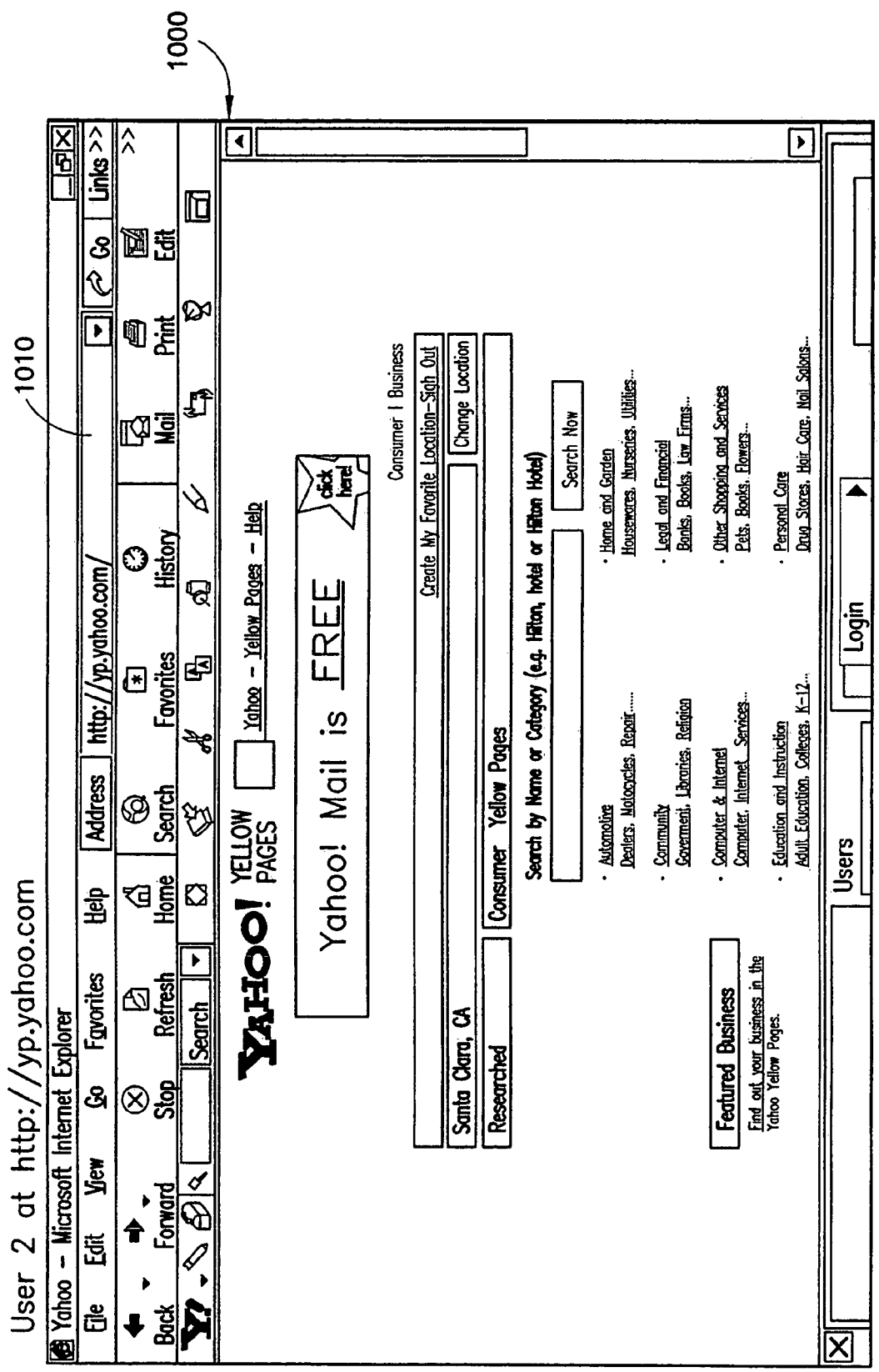
FIGS. 12A and 12B respectively depict navigation by a second user from a first Internet site to a second Internet site and controlled by a first user in accordance with an embodiment of the present invention.
Figure 12B:
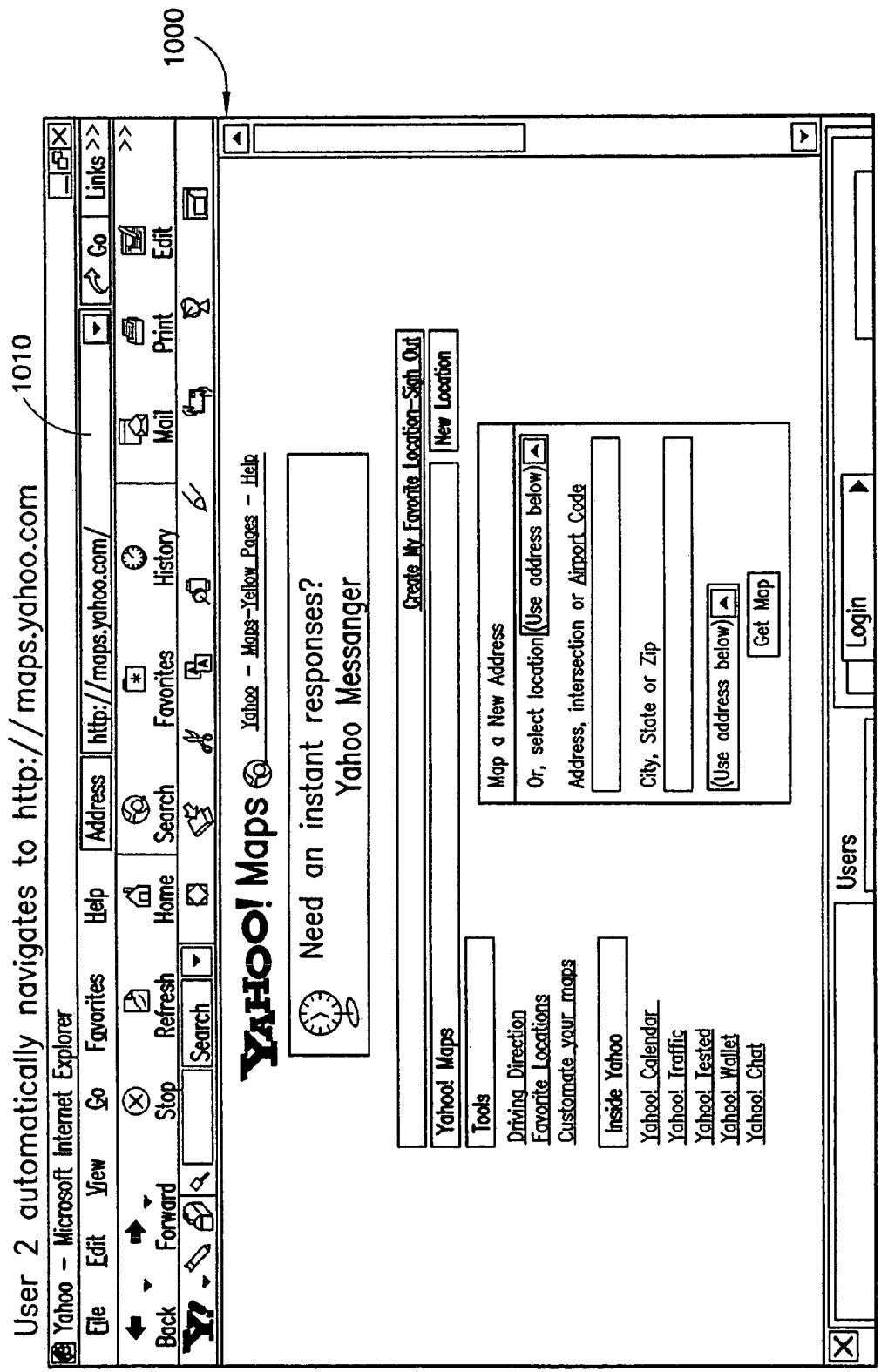

Navigation control as just described in accordance with an embodiment of the present invention is also depicted in FIGS. 11A, 11B, 12A and 12B. In FIG. 11A, a browser window 1000 displays a web page associated with a particular url. When User 1 navigates to a different url, the web page associated with that different url is displayed in the browser window 1000, as depicted in FIG. 11B. FIGS. 12A and 12B and temporally related to FIGS. 11A and 11B, respectively. In FIG. 11A, User 2's Internet browser causes a web page associated with a particular url to be displayed in a browser window 1000. In FIG. 12B, User 2's Internet browser is caused to navigate to the web page to which User 1 has just navigated.

Figure 13A:
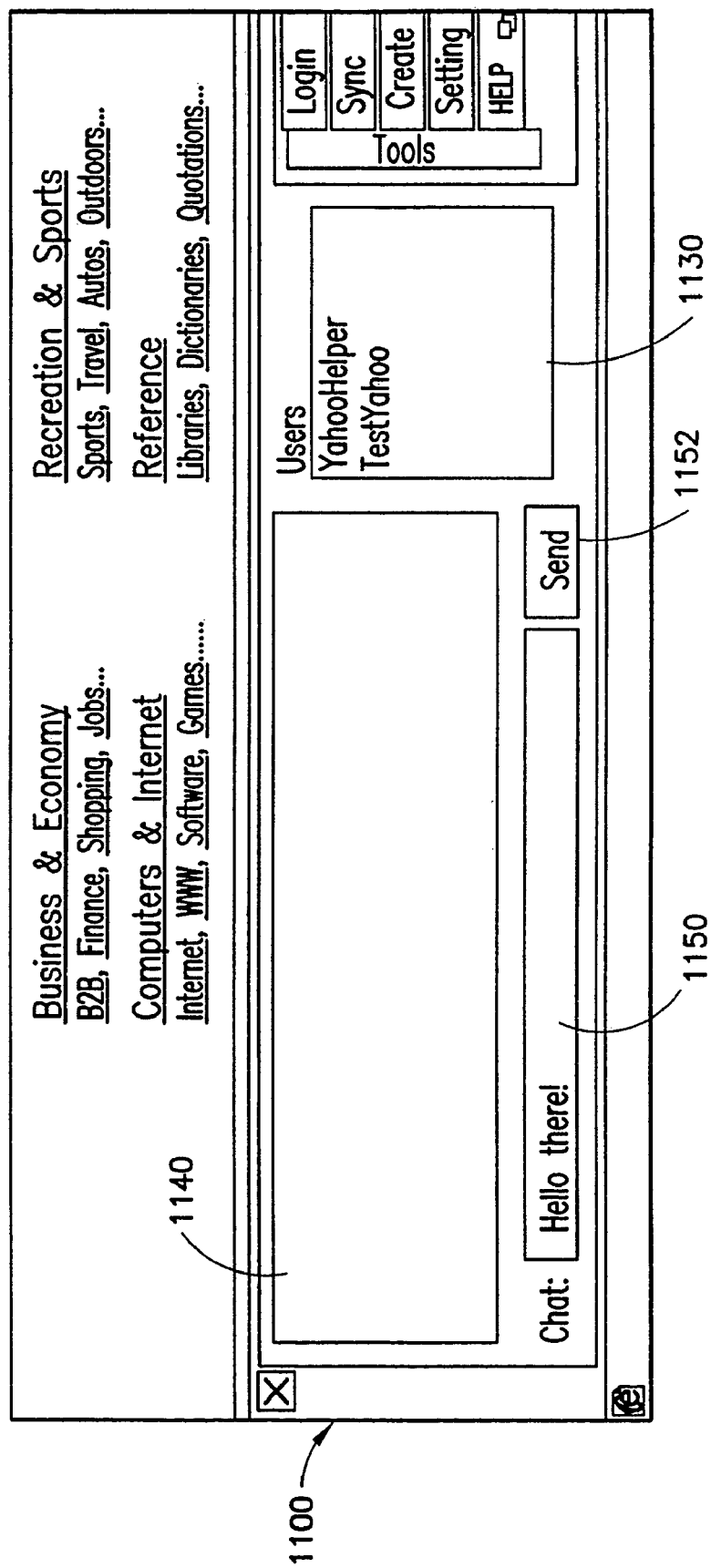
FIGS. 13A and 13B respectively depict an instant message sent by a first user and received by a second user in accordance with an embodiment of the present invention.
Figure 13B:
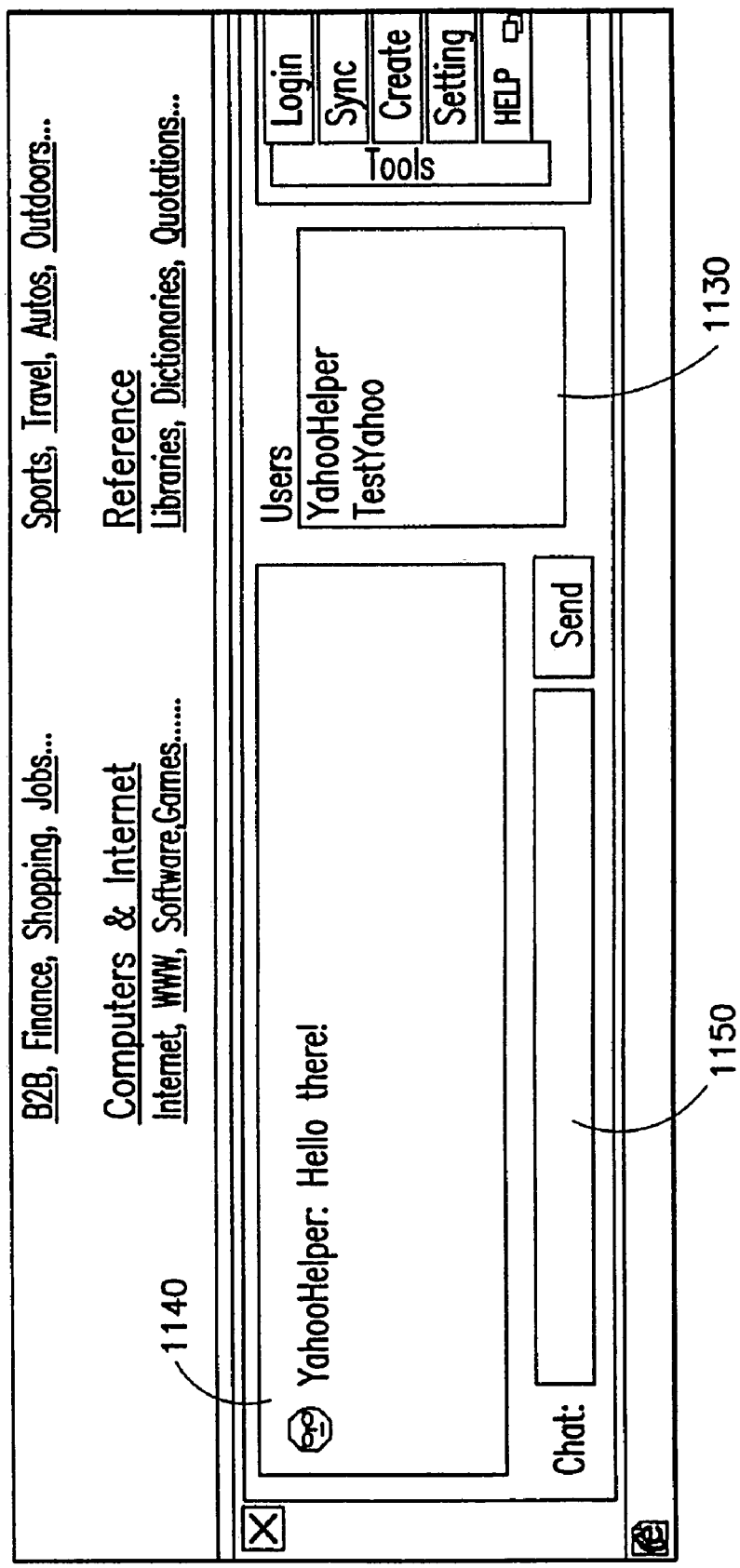

The present invention also enables User 1 to send an instant message to User 2, or to any other synchronized user. The explorer bar 1100 provides an instant message receive window 1140 and an instant message send window 1150, as depicted in FIG. 13A. To send an instant message to User 2, User 1 types a message in the instant message send window 1150, and selects a send button 1152. The script providing the instant message functionality creates an XML feed to package the data to be sent to User 2. The XML feed may have the following format:

```
<XML>
<DATA>
<SENDER>User 1's username</SENDER>
<MSG>Message</MSG>
</DATA>
</XML>
```

This XML feed, along with the sender's username (User 1's username) and the receiver's username (User 2's username) are passed to a synchronization function (e.g., a "SyncIt" function) in the ActiveX control. The ActiveX control receives that data and transmits it to the server 100 along with a synchronization identification to notify the server 100 that it is a synchronization message. The server 100 interprets the data as a synchronization message, and passes the data to the user identified in the data (i.e., User 2) provided that that user is logged into the synchronization group. More specifically, the server 100 transmits that data to User 2's ActiveX control, which parses the XML feed it has received and passes this parsed data (the instant message, etc.) to a script. The script analyzes the data, and identifies it is an instant message, and causes the message to be displayed in the instant message receive window 1140 using an IFrame on User 2's explorer bar 1100.

It should be noted that while the present invention has been described terms of a single script and ActiveX control on each user's computer, that is but one embodiment of the present invention. Alternatively contemplated by and within the scope and spirit of the present invention are multiple scripts and/or ActiveX controls on each user's computer.

It has also been disclosed herein that certain software is downloaded from the server 100 to each user' computer to provide the various script(s), control(s) and functionality of the present invention. Alternate embodiments of providing the script(s), control(s) and functionality of the present invention are also contemplated. Such alternate embodiments include, by way of non-limiting example, CD-ROM for direct installation on the user's computer.

Moreover, the network via which the users are connected to the server need not be the Internet. The present invention also contemplates any type and configuration of network, including intranets, cellular, satellite, and any other means for interconnecting a plurality of computers for communication therebetween and thereamong.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method comprising:

establishing communication over a network between a first and a second computer via a server, the second computer having a second script and a second control loaded thereon and operable in connection therewith;

communicating, to the first computer over the network, computer code comprising a first script operable in connection with the first computer for accessing a function of a first control loaded on the first computer, the first script being further operable for receiving data input by a user of the first computer and for causing the first control to communicate with the server and to transmit the data input by the user to the server; and causing the server to dynamically transmit the data received from the first script to the second computer for receipt by the second control over the network, the first script facilitating display modifications to content displayed on the first computer to be displayed on the second computer, the modifications comprising at least inserting additional content into the displayed content.

2. A method as recited by claim 1, wherein the computer code further comprises the first control.

3. A method as recited by claim 1, wherein the first script displays data output to a user of the first computer.

4. A method as recited by claim 1, wherein the first script sends data to and receive data from the first control.

5. A method as recited by claim 1, wherein the first script calls the function of the first control.

6. A method as recited by claim 5, wherein the first script sends data to and receive data from the function of the first control.

7. A method as recited by claim 1, wherein the first script is operable in connection with the first computer by opening a web page containing the first script.

8. A method as recited by claim 1, wherein the server comprises a synchronization group, and wherein the function of the first control comprises:

a login function to enable the user of the first computer to login to the synchronization group;

a synchronization function to enable the user of the first computer to synchronize with a member of the synchronization group; and a navigation function to enable control of the Internet navigation of a computer of the member of the synchronization group based upon the Internet navigation of the first computer.

9. A method as recited by claim 8, wherein the function of the first control further comprises an instant message function to enable a user of the first computer to send an instant message to a member of the synchronization group.

10. A method comprising:

downloading, to a first computer over a network, first computer code comprising a first script operable in connection with the first computer for accessing a function of a first control loaded on the first computer, the first script being further operable for receiving data input by a user of the first computer and for causing the first control to communicate with a server and to transmit the data input by the user to the server;

downloading, to a second computer over the network, second computer code comprising a second script operable in connection with the second computer for accessing a function of a second control loaded on the second computer, the second script being further operable for receiving data input by a user of the second computer; and dynamically communicating the data received from the first script to the second computer for receipt by the second control over the network, the first script facilitating display modifications to content displayed on the first computer to be displayed on the second computer, the modifications comprising at least inserting additional content into the displayed content.

11. A method as recited by claim 10, wherein the first computer code further comprises the first control.

12. A method as recited by claim 10, wherein the second computer code further comprises the second control.

13. A method as recited by claim 10, wherein the first script can display data output to the user of the first computer, and wherein the second script can display data output to the user of the second computer.

14. A method as recited by claim 10, wherein the first script can send data to and receive data from the first control, and wherein the second script can send data to and receive data from the second control.

15. A method as recited by claim 10, wherein the first script can call the function of the first control.

16. A method as recited by claim 15, wherein the first script can send data to and receive data from the function of the first control, and wherein the second script can send data to and receive data from the function of the second control.

17. A method as recited by claim 10, wherein the first script is operable in connection with the first computer by opening a web page containing the first script, and wherein the second script is operable in connection with the second computer by opening a web page containing the second script.

18. A method as recited by claim 10, wherein the server comprises a synchronization group, and wherein the function of the first control comprises:
a login function to enable the user of the first computer to login to the synchronization group;
a synchronization function to enable the user of the first computer to synchronize with a member of the synchronization group; and
a navigation function to enable control of the Internet navigation of a computer of the member of the synchronization group based upon the Internet navigation of the first computer;
and wherein the function of the second control comprises:
a login function to enable the user of the second computer to login to the synchronization group;
a synchronization function to enable the user of the second computer to synchronize with a member of the synchronization group; and
a navigation function to enable control of the Internet navigation of the computer of a member of the synchronization group based upon the Internet navigation of the second computer.

19. A method as recited by claim 18, wherein the function of the first control further comprises and instant message function to enable a user of the first computer to send an instant message to a member of the synchronization group, and wherein the function of the first control further comprises and instant message function to enable a user of the first computer to send an instant message to a member of the synchronization group.

20. A computer readable storage medium tangibly encoded with computer-executable instructions which perform a method comprising:
facilitating communication over a network between a first computer and a second computer, the second computer having a second script and a second control loaded thereon and operable in connection therewith;
receiving data over the network input by a user of the first computer in accordance with a first script loaded on the first computer; and
dynamically communicating over the network the data input by the user, in accordance with a first control loaded on the first computer and configured to be accessible by the first script, to the second computer for receipt by the second control, the first script facilitating display modifications to content displayed on the first computer to be displayed on the second computer, the modifications comprising at least inserting additional content into the displayed content.

21. A computer readable storage medium as recited by claim 20, wherein the first script sends data to and receives data from the first control.

22. A computer readable storage medium as recited by claim 20, wherein the first script calls the function of the first control, and the first script sends data to and receives data from the function of the first control.

23. A computer readable storage medium as recited by claim 20, wherein the first script is operable in connection with the first computer by opening a web page containing the first script.

24. A computer readable storage medium as recited by claim 20, wherein said communication between the first computer and the second computer is via a server comprising a synchronization group, and wherein a function of the first control comprises:
a login function to enable the user of the first computer to login to the synchronization group;
a synchronization function to enable the user of the first computer to synchronize with a member of the synchronization group; and
a navigation function to enable control of the Internet navigation of a computer of the member of the synchronization group based upon the Internet navigation of the first computer.

25. A computer readable storage medium as recited by claim 24, wherein the function of the first control further comprises an instant message function to enable a user of the first computer to send an instant message to a member of the synchronization group.

* * * * *

UNITED STATES PATENT AND TRADEMARK OFFICE
CERTIFICATE OF CORRECTION

PATENT NO. : 7,650,378 B2  Page 1 of 1
APPLICATION NO. : 11/337128
DATED : January 19, 2010
INVENTOR(S) : Shafron et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this

Twenty-third Day of November, 2010

David J. Kappos
*Director of the United States Patent and Trademark Office*